March 11, 1969 D. C. CRAWFORD ET AL 3,431,828

BAG STACKER

Filed Sept. 17, 1965 Sheet 1 of 21

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN
BY Hans G. Hoffmeister
ATTORNEY INVENTORS
DONALD C. CRAWFORD
VEIKKO K. VIITANEN, JOHN D. HOFFMAN
BY Hans G. Hoffmeister
ATTORNEY March 11, 1969 D. C. CRAWFORD ET AL 3,431,828

BAG STACKER

Filed Sept. 17, 1965 Sheet 4 of 21

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN
BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

BAG STACKER

Filed Sept. 17, 1965

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN
BY Hans G. Hoffmeister
ATTORNEY INVENTORS
DONALD C. CRAWFORD
VEIKKO K. VIITANEN, JOHN D. HOFFMAN
BY Hans G. Hoffmeister
ATTORNEY

MACHINE STACKING

INVENTORS
DONALD C. CRAWFORD
VEIKKO K. VIITANEN, JOHN D. HOFFMAN
BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN
BY Hans G. Hoffmeister
ATTORNEY

INDEX CYLINDER EXTENDED

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN

BY Hans G. Hoffmeister
ATTORNEY

BAG STACKER

INVENTORS
DONALD C. CRAWFORD
VEIKKO K. VIITANEN, JOHN D. HOFFMAN

BY Hans G. Hoffmeister
ATTORNEY

INVENTORS
DONALD C. CRAWFORD
VEIKKO K. VIITANEN, JOHN D. HOFFMAN
BY Hans G. Hoffmeister
ATTORNEY INVENTORS
DONALD C. CRAWFORD
VEIKKO K. VIITANEN, JOHN D. HOFFMAN
BY Hans G. Hoffmeister
ATTORNEY 3,431,828
BAG STACKER Donald C. Crawford, Mountain View, and Veikko K. Viitanen, San Jose, Calif., and John D. Hoffman, Green Bay, Wis., assignors to FMC Corporation, San Jose, Calif., a corporation of Delaware Filed Sept. 17, 1965, Ser. No. 488,037
U.S. Cl. 93—13 34 Claims
Int. Cl. B31b *21/14, 1/62*

ABSTRACT OF THE DISCLOSURE

Apparatus is disclosed for automatically providing a stack of thin, extremely flexible articles, such as bags made of cellophane, polyethylene, or the like, such as bags destined to receive loaves of bread. In the broader aspects of the invention, other materials such as sheets of paper can be stacked.

Many bakeries are now operating bag filling machines which insert loaves of bread into bags, with the supply of bags being provided in the form of a stack of bags impaled on a pair of pins, which will be referred to as transport wickets. According to one aspect of the present invention, the bags are formed from a web of sheet material in a bag making machine, and the completed bags are provided with a pair of slits or perforations for receiving the transport wickets. The transport wickets maintain an aligned stack of bags during transfer from the bag making machine to the bag filling machine, which may involve shipping from a plant which manufactures the bags to a bakery. The slits or holes in the bags provide for easy, clean tear off of the bags from the wickets at the bag filling machine. In accordance with the present invention bags are received from the bag making machine, and formed into a stack, ready for transfer to the transport wickets and on to the bag filling machine. In the case of bread bags, the stacking posts or pins on the stacker are tubular. The transport wickets are inserted into the tubular pins, and the stack of bags is thereby transferred to the transport wickets. The stack of bags is now ready for insertion into a bag filling or any other machine or device which accepts the stacked bags.

It is an object of the present invention to provide apparatus that forms a stack of flexible articles, such as the bags referred to above, which articles are impaled on spaced pins or wickets, to form a registered stack of the articles.

Another object is to transfer flexible, individual sheets or articles such as completed bags, from a bag making machine to a bag stacking machine conveyor, without damage to the bags during transfer and pick-up, and to pick up the bags at the stacker in a manner that insures that the bags maintain their orientation in their plane during transfer.

A further object of the invention is to provide stacks of bags of the type described, by feeding the bags on a continuously moving, frictional gripper conveyor, and precisely stacking the bags on the stacking posts or pins while the bag feeding conveyor is moving at high speed. Since the transport wickets are mere separate accessories not forming part of the bag stacker, for clarity of identification the stacking posts or pins will also be referred to as "wickets."

It is an object of the present invention to provide means for successively presenting pairs of impaling pins in precise alignment with the bag stacker plungers, while maintaining fail safe indexing control, and without requiring vernier control switch positioning.

It is also an object to provide web folding means for maintaining the lip edge of the bags in a fixed lateral position while providing means for adjusting the lip width. When the stacker is connected to a bag making machine, this also maintains constant the position of the edge of the lip in the bag making machine and the bag stacker.

It is also an object to cause the free ends of the bags or articles to drop down on the stack without curling or turning upon themselves.

Another object is to drape the stack from the pins in a manner which prevents curling of the sides of the articles under gravity.

Bags may be supplied to the stacker having pre-punched wicket holes in their top end flap, and these usually have tear slits between the holes and the edge, in order to facilitate tearing the bags loose from the wickets at the bag filling machine. The high speed stacking of pre-punched bags presents more difficulties than does the stacking of unpunched bags, wherein the impaling pins or wickets on the stacker actually punch their own holes.

In stacking pre-punched bags, the bag receiving pick-off and conveying devices must present the moving bags precisely and consistently to the impaling mechanism, in order that the stacking pins or wickets be centered in the pre-punched holes. Stacking by impaling unpunched bags involved no such requirement, and the entire stack can be formed with a longitudinal offset from the true centered position. Also, the pre-punched flaps are easily torn, which complicates rapid stripping from a high speed stacker feed conveyor, particularly, if the latter grips the punched flaps firmly enough for maintaining end to end square alignment.

Accordingly, it is another object of the invention to provide precise, tear free and rapid pin stacking or pre-punched articles such as bags. This requires precise timing of the stacking operation, and also requires that the conveyor belts which grip the ends of the atricles grip them uniformly, so that there is no shifting during transport. Also the relative effective gripping forces from side to side of the machine (end to end of the bags in the embodiment disclosed) should be equal. If the punched ends of the bags are gripped too firmly, tearing will result. If the punched ends of the bags are gripped less firmly at one end than at the other end, the stripping of the bags will not progress in a uniform, synchronized manner at each end.

The conveyors of the present invention make it possible to equalize the resistance to stripping at each side of the machine, and this is another feature of the invention.

Another object is to insure synchronized descent of the stripping plungers so that both ends of the articles are freed simultaneously.

It is also an object to momentarily trap the free, unwicketed ends of the articles as they are stripped from the conveyor, and so prevent turn up or turn in of the free ends as they fall and drape over the wicketed stack.

Another object is to facilitate stripping and impaling the moving articles by rapidly descending plungers, using a brief, shock-free plunger cycle.

The manner in which these and other objects of the present invention may be attained will be apparent from the following detailed description of the invention.

In the drawings:

FIGURE 1D is a schematic section at the plungers, showing how the belts of the conveyor grip a bag.

PRINCIPLE OF OPERATION

Figure 1:
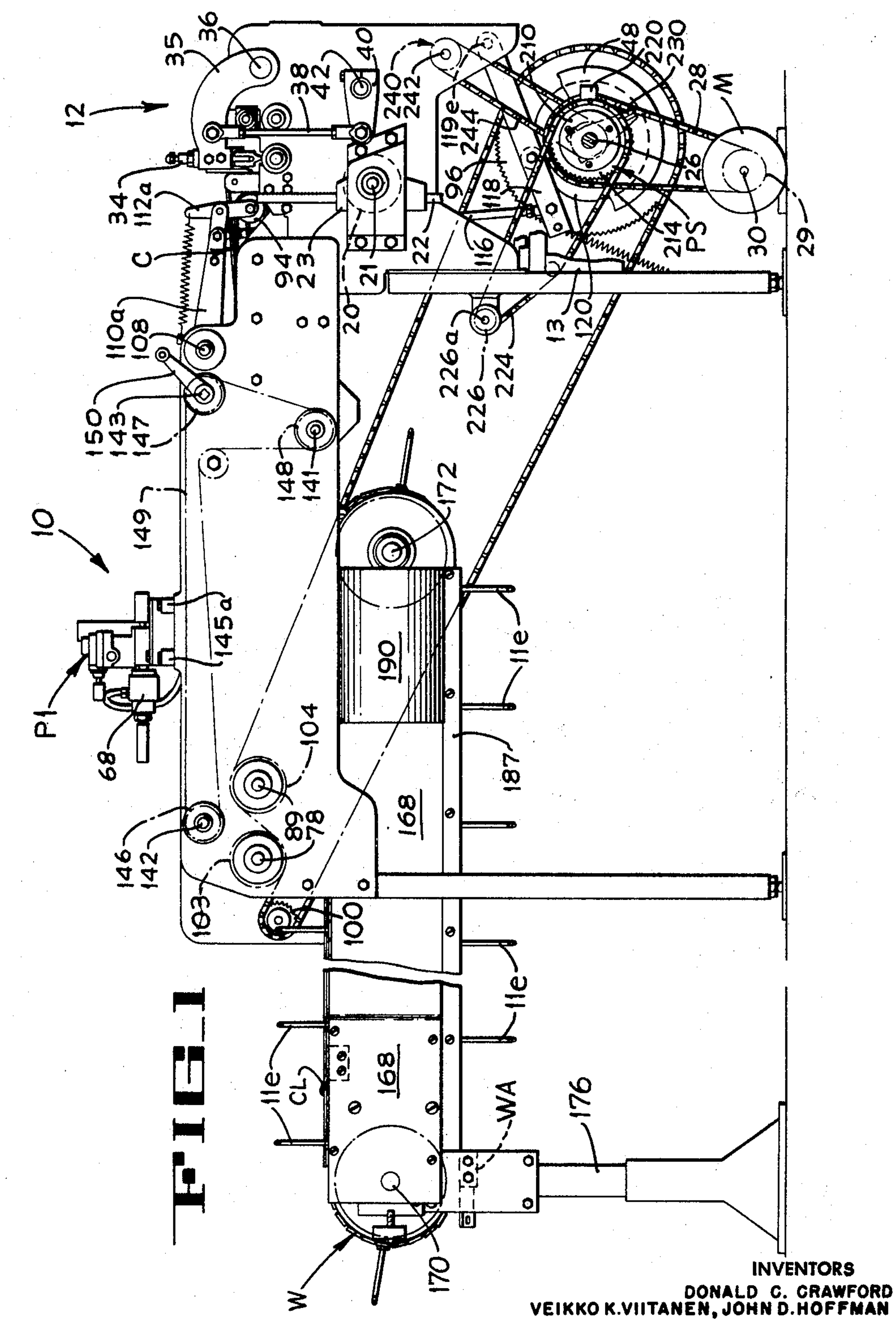
FIGURE 1 is a side elevation of the bag stacker and a poriton of the bag making machine at the bag stacker, with the clutch and brake drive crank broken away.
Figure 1B:
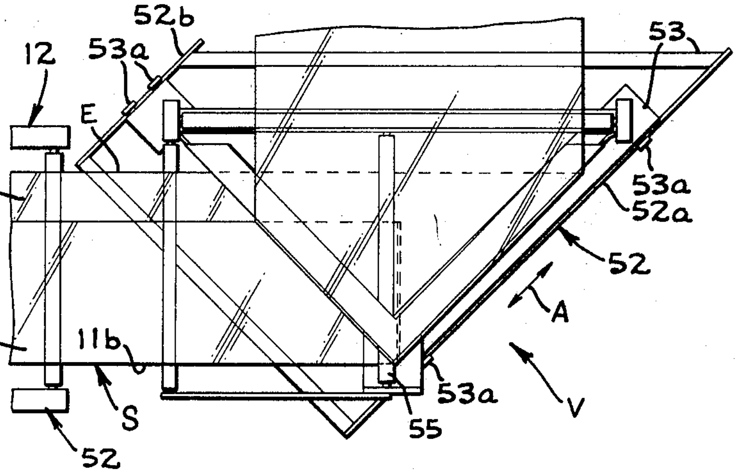
FIGURE 1B is a schematic fragmentary operational plan of the web feeding and V-board folding apparatus for the bag making machine.

Referring to FIGURES 1–4, the bag stacker 10 of the present invention is integrated with a bag making machine 12 and a web folding V-board V. The V-board is adjustable in a novel manner in the direction of arrow A, FIGURE 1B, to fold a web or strip S of plastic material having a lower sheet 11, and a narrower upper sheet 11*a*, these sheets being folded over at what will be the bottom edges 11*b* of the bags B. As the strip S advances intermittently through the bag making machine 12, the strip S is cut and sealed along the cut and seal line indicated in FIGURE 1C, to form completed bags B, having sealed side edges *s*, FIGURE 1A.

The completed bags B entering the bag stacker 10, have flaps 11*c* forming part of the lower wall 11 of the bottom sheet, and these flaps are punched to provide holes 11*d* by mechanism Q in the bag making machine 12.

The bags B are gripped frictionally by ribbed belts of a continuously driven conveyor C forming part of the bag stacker 10 of the present invention. The bags are successively presented above wicket pins 11*e* on an indexing wicket conveyor W. While the bags B pass the wicket pins 11*e*, a pair of remotely controlled fluid plunger units P and P1 are quickly lowered and retracted. As plunger P on the far side of the bag stacking machine is lowered, it strips the flaps 11*c* from the associated belts of conveyor C. The far side plunger P feeds the punched flaps 11*c* down, with the punched holes 11*d* in the bag flaps 11*c* passing over the pins 11*e* of the wicket conveyor W, the latter being stationary during the stacking operation. Simultaneously the near side plunger P1 strips the bottoms 11*b* of the moving bags from the associated belts of conveyor C, and the bags drape in a stack, FIGURE 5.

Figures 1A, 1E:
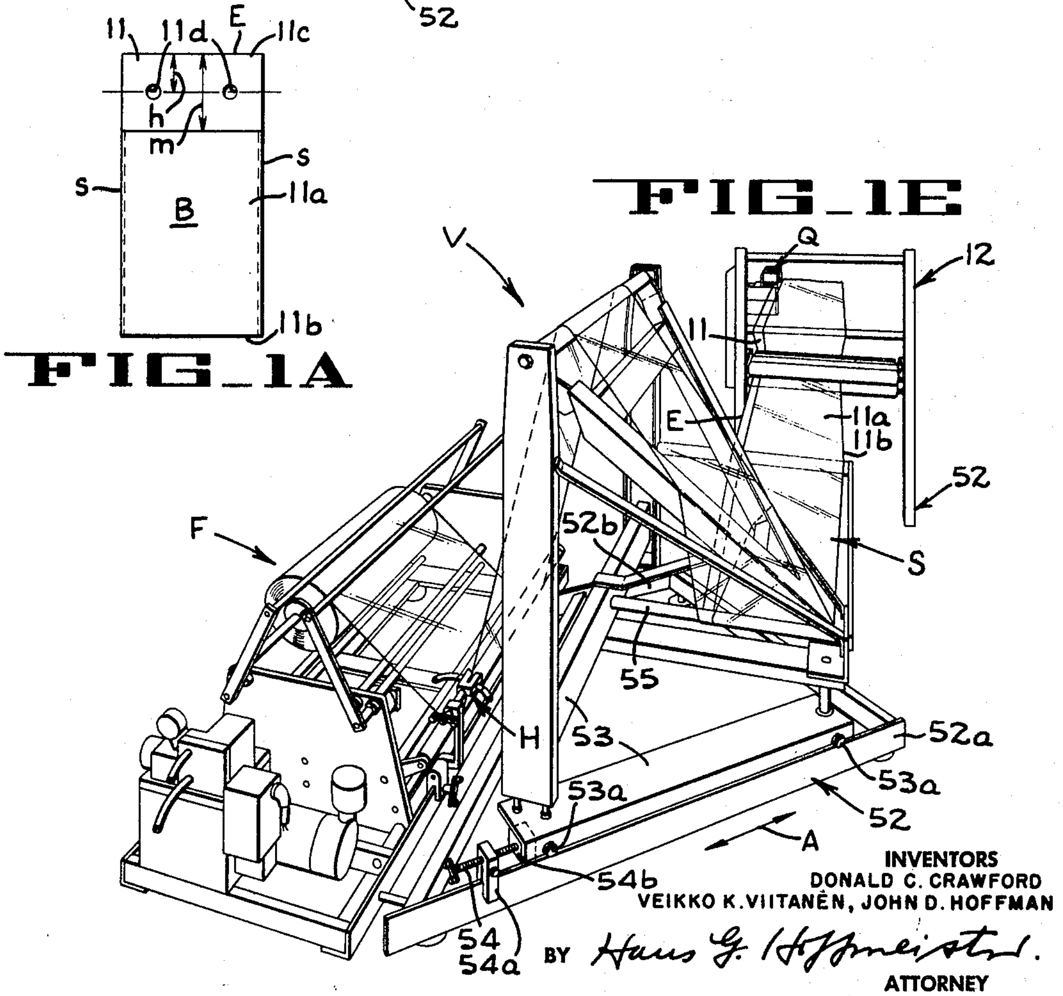
FIGURE 1A is a plan of a completed empty bag.
FIGURE 1E is a perspective showing the adjustable V-board.
Figure 1C:
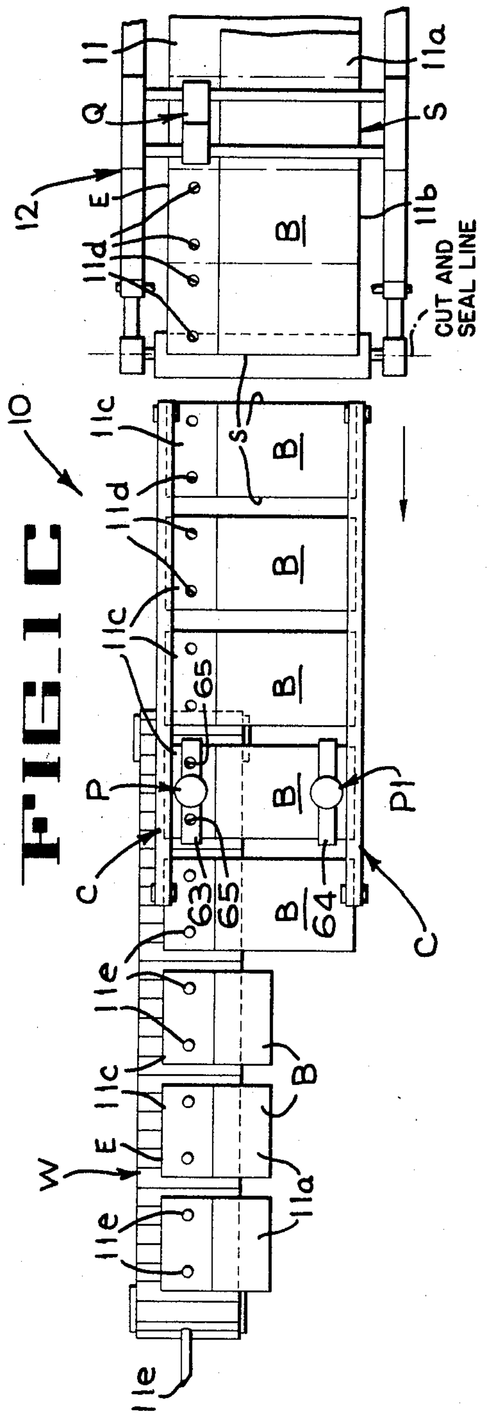
FIGURE 1C is a continuation of FIGURE 1B, showing the bag making machine, stacker and wicket conveyor.

The adjustment of the V-board along arrow A maintains the position of the edge E of the strip S constant, FIGURE 1A, while varying the width *m* of the flap 11*c*.

This stacking operation continues, with the timed, intermittent operation of the bag making machine 12, the continuously running stacker conveyor C, and the bag stripper plunger units P, P1, until a stack having a predetermined number of bags is formed at the station of the plungers P and P1. The operation of the bag machine, and the plungers P, P1 is now stopped, and the wicket conveyor W indexes automatically to bring a new set of pins 11*e* under the plunger P. When the wicket conveyor W has been fully indexed, operation of the bag machine 12 and the stacker plungers P, P1 is resumed. The operator removes a stack of bags from the wicket conveyor W after indexing of the latter.

GENERAL DESCRIPTION

Both the bag making machine 12 and the bag stacker 10 are driven by a continuously running, variable speed gear motor M, of conventional design (FIG. 1). Many of the details of the bag making machine are not crucial to the present invention. However, those elements of the bag making machine 12 that are intimately associated with the bag stacker 10 of the present invention, will be described briefly, in order to facilitate an understanding of how the bag stacking machine 10 picks up bags from the bag making machine 12, and then stacks them, on the wickets of an indexing wicket conveyor W, and how the bag stacker and bag maker are controlled. A bag making machine 12 suitable for connection to the bag stacker 10 of the present invention is manufactured by the Packing Machinery Division of the FMC Corporation, at Green Bay, Wis., as the Simplex Model 115W machine.

Figure 3:
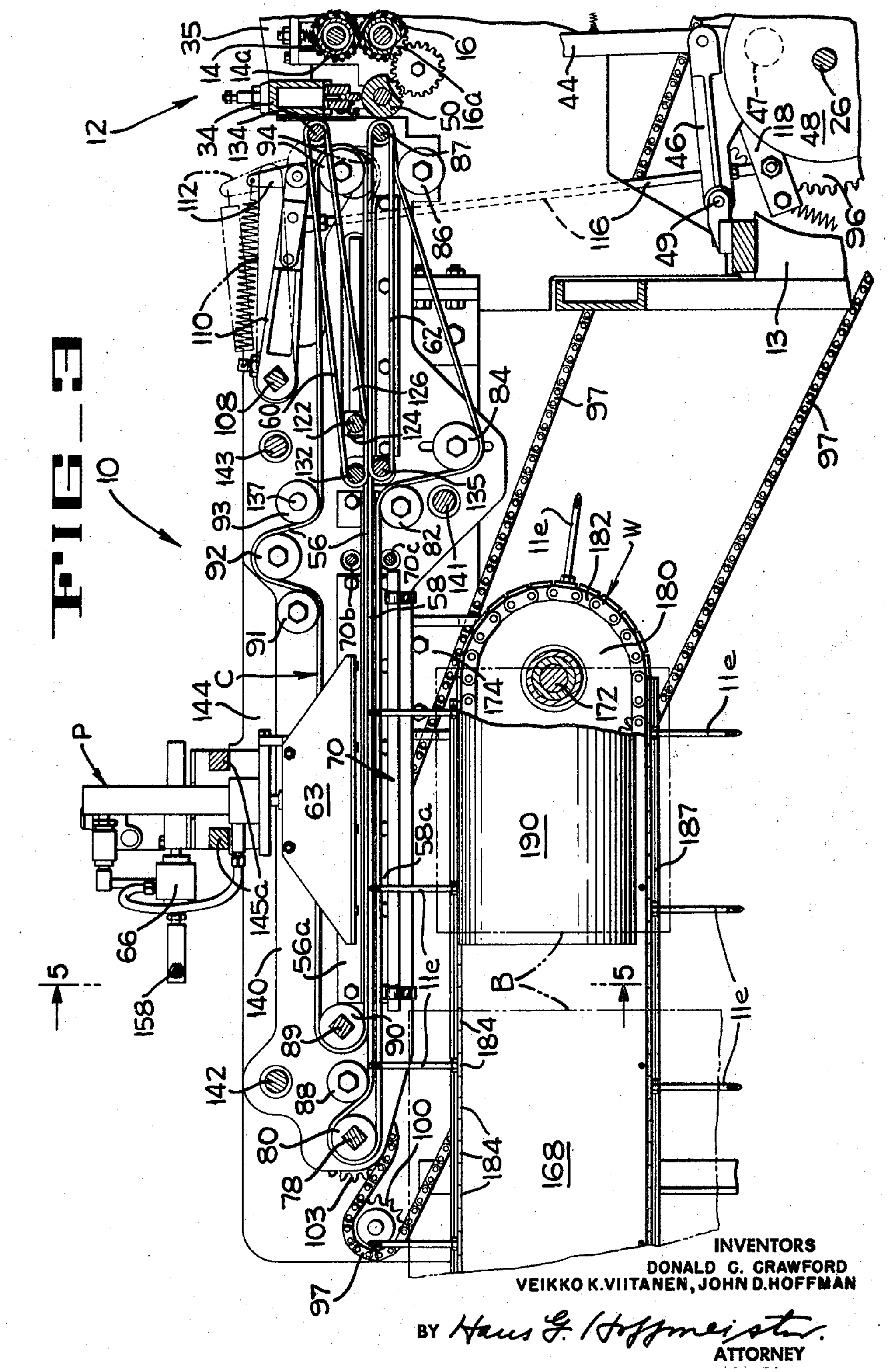
FIGURE 3 is an enlarged fragmentary longitudinal section of the delivery end of the bag stacker, taken on lines 3—3 of FIGURE 2.
Figure 4:
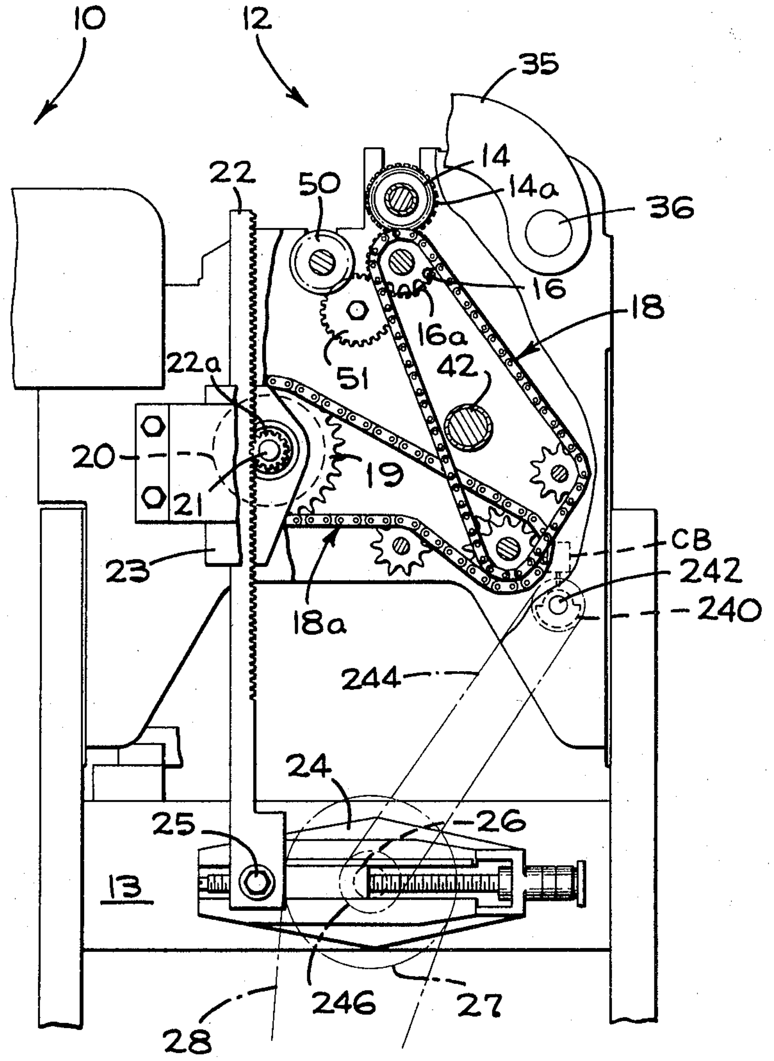
FIGURE 4 is a fragmentary side elevation detail of the bag making machine clutch and brake feed drive.

The bag making machine 12 includes a pair of intermittently operated feed rolls 14, 16, that are geared together by gears 14*a* and 16*a* (FIG. 3), driven by chain and sprocket assemblies 18 and 18*a* driven in turn by a sprocket 19 (FIG. 4) on a clutch and brake assembly 20 (FIGURES 1 and 4). The clutch and brake assembly 20 is a remotely controlled, magnetic unit of conventional design. The design details of this assembly are not critical to the present invention, and a clutch and brake assembly suitable for the invention is sold as the Auto Gap Unit, by the Warner Electric Company of Beloit, Wis. The shaft 21 of the clutch and brake assembly 20 is continuously oscillated by a rack 22 that drives a pinion 22*a* on the clutch and brake assembly shaft 21. The rack 22 is mounted in a swinging housing 23, which is oscillated about the shaft 21 for the pinion 22*a* (FIGS. 1 and 4). An adjustable length crank 24 (FIG. 4) is continuously rotated and connected at 25 to the rack 22. The crank 24 is mounted on the near end of a master shaft 26 (FIG. 4), that is mounted in frame elements 13 at each side of the machine. The master shaft 26 has a sprocket 27, driven by a chain 28 and a sprocket 29 on an output shaft 30 (FIG. 1) on the continuously running gear motor M. Thus the clutch and brake shaft 21 is continuously oscillated, as described.

After the bags B have been folded up, sealed and punched by a pair of conventional, adjustable punches Q at bag making machine mechanism (FIG. 1C), the bags are cut off along their sides *s* from the strip S of connected bags, by a heated cut off and sealer bar 34, which is mounted on an arm 35 pivoted on the bag making machine frame at 36 (FIG. 1). The cut off arm 35 is normally continuously raised and lowered by a bar lift rod 38 (FIG. 1). The lower end of the rod 38 connects to a bar lift crank 40, which is oscillated by a rock shaft 42. The cut off and sealer bar rock shaft 42 is oscillated by an over-center cam link 44 (FIG. 3), which connects to a cam follower arm 46 having a cam roller 47 oscillated by a cam 48, with cam 48 being mounted on the continuously driven master shaft 26. The sealer bar cam follower arm 46 is pivoted on the frame at 49. The connection between the link 44 (FIG. 3) and the rock shaft 42 (FIG. 1) for operating the sealing and cut off arm 35, is part of the bag making machine 12, and the details thereof are not critical to the invention. Hence this connection has been omitted from FIGURES 1 and 3 for clarity. The bag making machine 12 also includes a web drive motor at the input end of the apparatus which can be clutched to a stop by the control circuit. The details of the web drive motor are not critical to the machine of the present invention, and hence are not illustrated. The bag making machine also includes a cut off roller 50 (FIGS. 3 and 4), driven by an idler gear 51 meshed with the gear 16*a* on the lower feed roller 16. The cut off roller 50 cooperates with cut off and heated sealing bar 34 (FIG. 1), carried by the arm 35.

ADJUSTABLE V-BOARD

As mentioned, in the bag folder-bag maker-bag stacker system of the present invention, it is essential that edge E be held whenever lip width *m* (FIG. 1A) is adjusted. This is done by adjusting the V-board V in a novel manner. Referring to FIGURE 1E, the supply roll at the feeder F is shifted axially under control of an air jet sensing edge holder control H in the conventional manner. The frame 52 for the system (which may include the floor) has parallel 45° tracks 52*a*, 52*b* mounting a V-board carriage 53 on rollers 53*a*. A vernier adjustment screw 54, threaded in a clamp nut 54*a* supported on the frame 52, and journalled in a bearing 54*b* on the carriage, shifts the V-board in the direction of the arrow A. This adjusts the lip width *m* formed as the folded web passes under the conventional delivery roller 55, while holding the edge E, as described.

DETAILED DESCRIPTION OF STACKER

Figure 10:
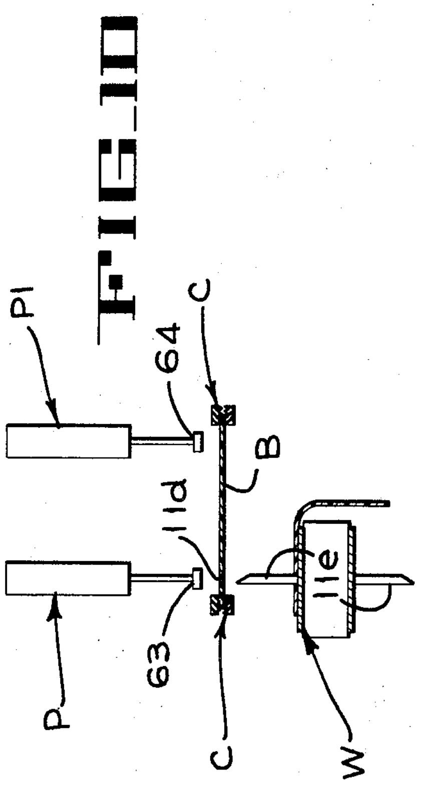
FIGURE 10 is an enlarged section through one pair of grip conveyor belts.

The conveyor C of the bag stacker 10 includes a laterally spaced pair of upper conveyor grip belts 56, and mating lower belts 58. These belts are longitudinally ribbed as seen in FIGURE 10, in order to frictionally grip opposed sides of the bag for transportation of the bags individually to the plunger and wicket station. The opposed, bag gripping reaches of the belts 56, 58 are supported and confined along their lengths by upper and lower guide plates 56*a*, 58*a* as best seen in FIGURE 10.

A soft pad 59 formed of sponge rubber or a plasticized polyurethane foam is bonded to the lower plate 58*a*, and a nylon wear strip 59*a* is bonded to the upper face of the pad. A nylon strip 56*b* is bonded to the upper plate 56*a*. The pad 59 makes it possible to grip the bags firmly between the conveyor belts 56, 58, but it accommodates downward deflection of the inner side of the lower belt 58 when the bags are stripped. This prevents tearing of the bags, and the resilient grip at each end of the bag results in substantially equal effective resistances to stripping. Thus both ends of the bag are stripped. If the grip at one end were much looser than at the other, the loosely gripped end woud come free without providing enough "back up" or resistance to counteract the grip at the other end. The latter would not be stripped.

A plurality of upper and lower lead-in rubber O-ring belts 60, 62 (FIGS. 2, 6) support the bags along their length, as the bags are being fed to the pairs of ribbed conveyor belts 56, 58, and before they are fully gripped by the latter belts. The lower set of O-ring belts 62 actually support the bags, whereas the upper set of O-ring belts 60 confines the bags from excess upward motion. The usual static eliminators may be positioned between these belts, if desired.

Figure 8:
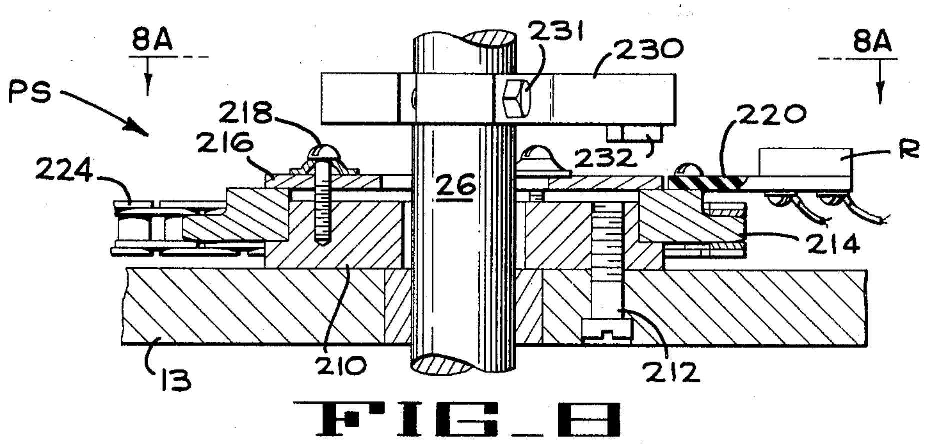
FIGURE 8 is a partial section through the plunger control magnetic reed switch assembly.
Figure 8A:
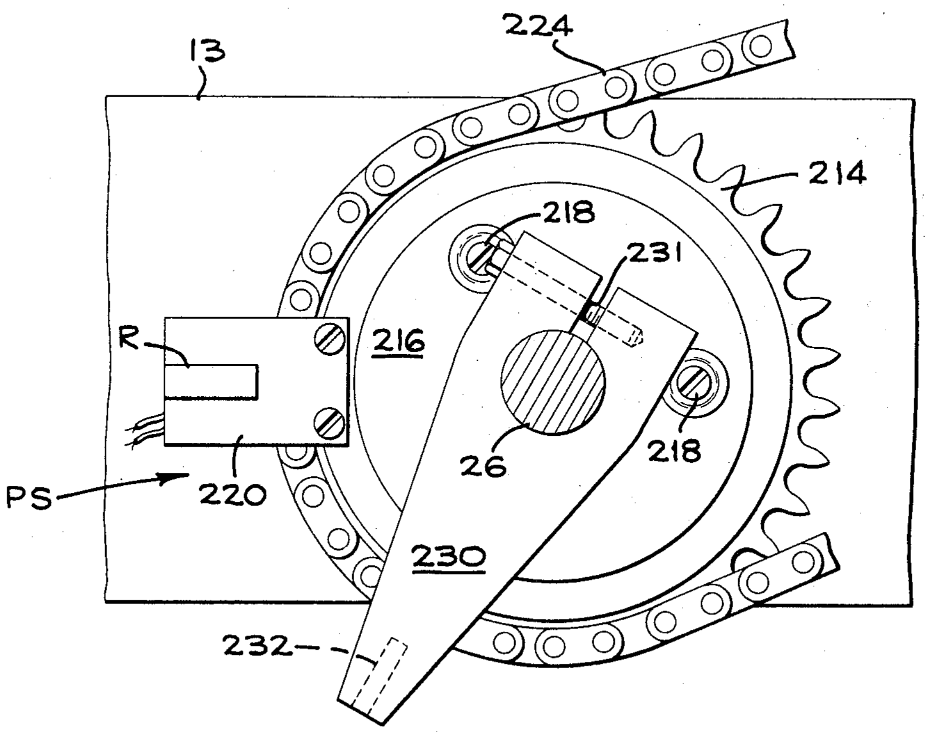
FIGURE 8A is a view of the magnetic switch assembly looking from lines 8A—8A of FIGURE 8, but with the magnet rotor turned away from the normally stationary reed switch.
Figure 10:
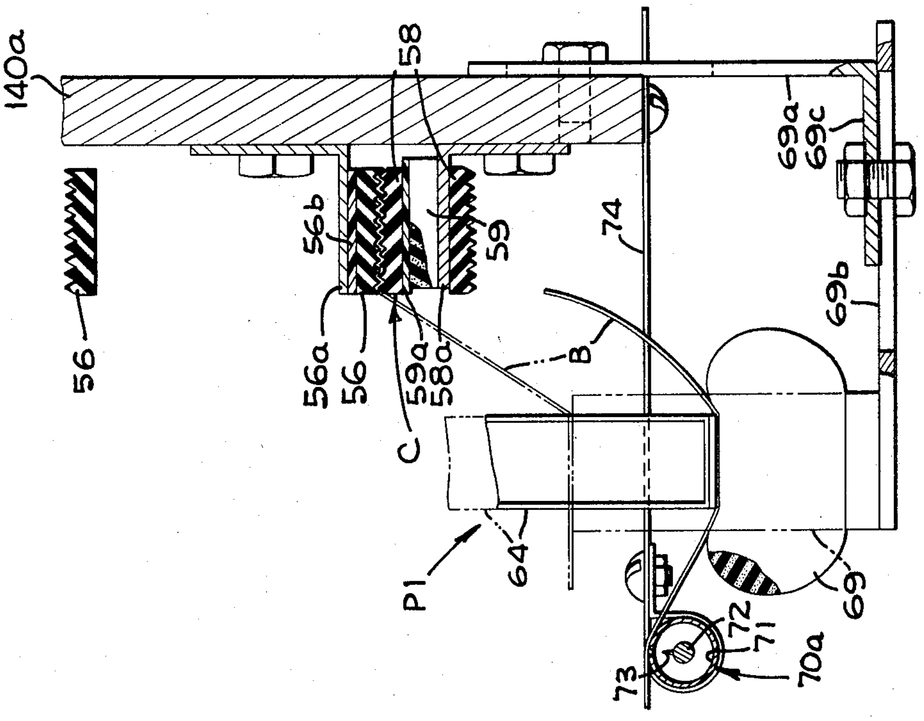

After the bags have been fully gripped by the ribbed conveyor belts 56, 58 they are carried past laterally spaced bag stripping plungers P, P1 (FIGS. 1, 2 and 5), which plungers are under control of a magnetic read switch R (FIGS. 8 and 8A), driven by the master shaft 26 (FIG. 1), as will be described in detail presently. The plunger assemblies P, P1 have stripper shoes 63, 64, which are rapidly lowered, to strip the bags from the ribbed conveyor belts 56, 58. The shoe 63 of the plunger assembly P at the far side of the machine is apertured at 65 (FIG. 2) to receive the wickets 11*e* as the shoe (FIGS. 2 and 5), slides the bags over the wickets of the wicket conveyor W, as the punched holes 11*d* pass over the wickets 11*e*, as previously described. A counter control indexes the wicket conveyor W after a predetermined number of stripping cycles. The wicket conveyor is indexed by a fluid operated linear actuator and pawl assembly.

Figure 23:
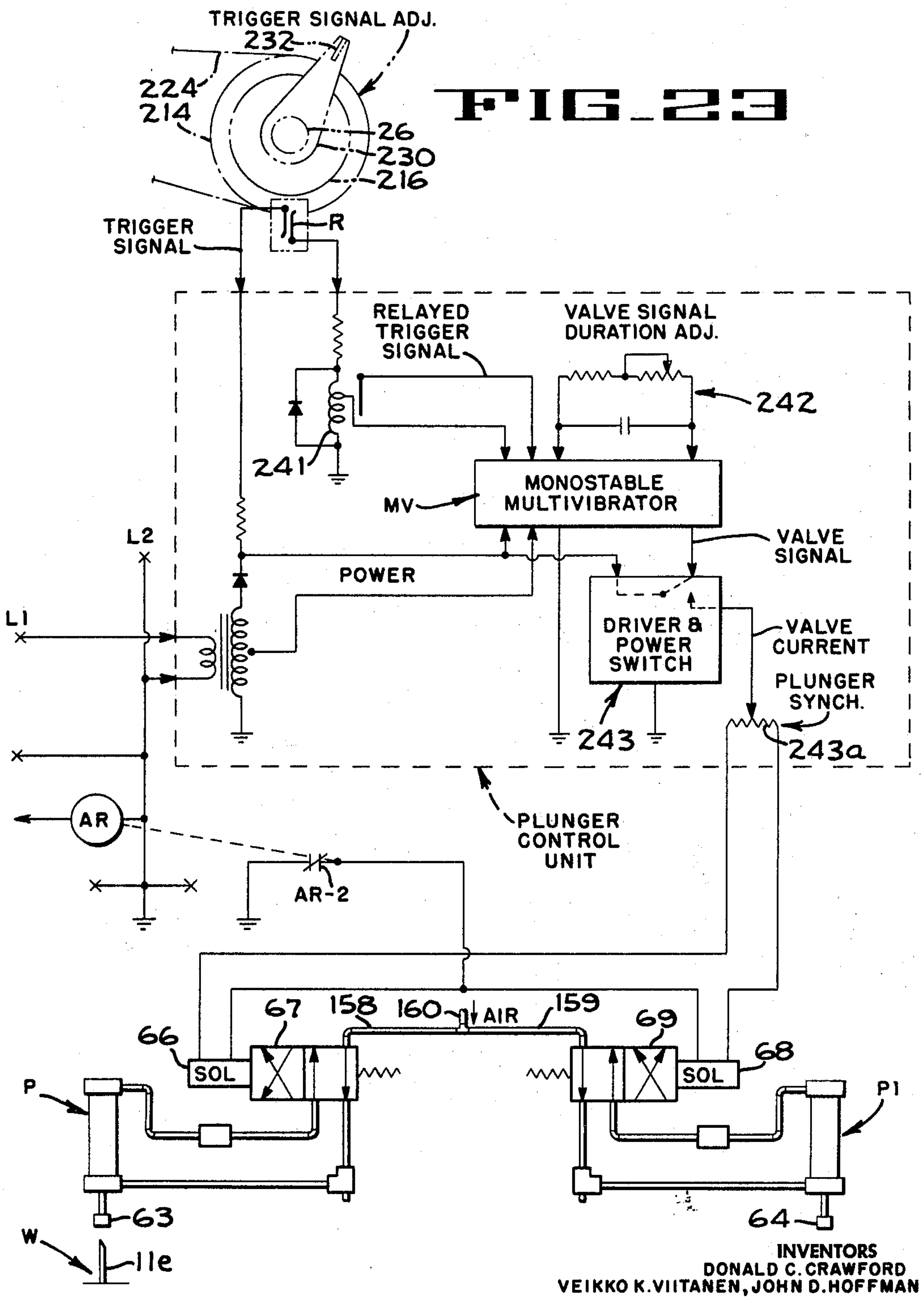
FIGURE 23 is a diagram of the plunger control system.
Figures 24, 25:
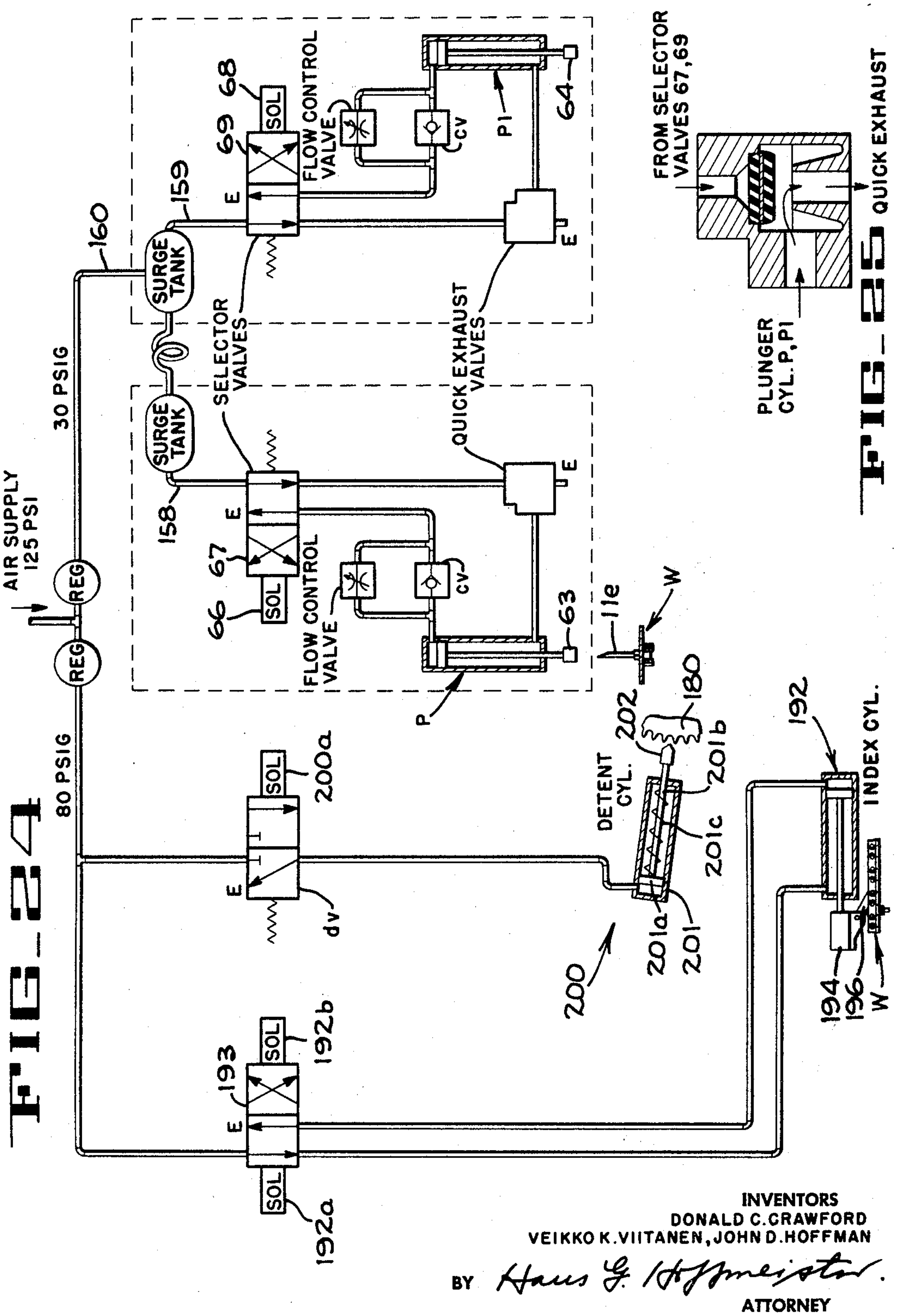
FIGURE 24 is a schematic of the air system.
FIGURE 25 is a diagram of a quick exhaust valve.

The plungers P and P1 are shifted by air valves 66, 68 which are solenoid operated to provide a precisely timed, rapid and cushioned down stroke, by electrical and pneumatic circuits to be described presently in conjunction with FIGURES 23 to 25.

When the bags are stripped from the conveyor belts 56, 58 (FIGS. 5 and 10), due to the rapidity of the action, the freed ends of the bags at the plunger shoe 64 tend to fly toward the wicketed ends, and cause a turn-in. This is prevented by trapping the stripped bag end between the near side plunger 64 and a soft, deformable pad 69 formed of sponge rubber, plasticized polyurethane foam, or the like. The pad 69 is adjustably mounted beneath the plunger shoe 64. The pad mounting is a vertically slotted bracket 69*a*, adjustably clamped to a near side conveyor belt mounting plate 140*a*, and a laterally slotted bracket 69*b* clamped to a foot 69*c* projecting from the bracket 69*a*. The rapid descent of the plunger shoe 64 traps the freed ends of the bags B (dotted lines, FIG. 10) immediately after they have been pulled clear of the conveyor belts 56, 58, and the descent of the plunger shoe 64 to its lowermost position (solid lines, FIG. 10) is accommodated by deformation of the pad 69. This trapping and temporary restraining action on the free bag ends absorbs energy imparted to the bag during stripping, which energy tends to cause the free ends of the bags to turn in.

Figures 5, 5A, 5B, 5C:
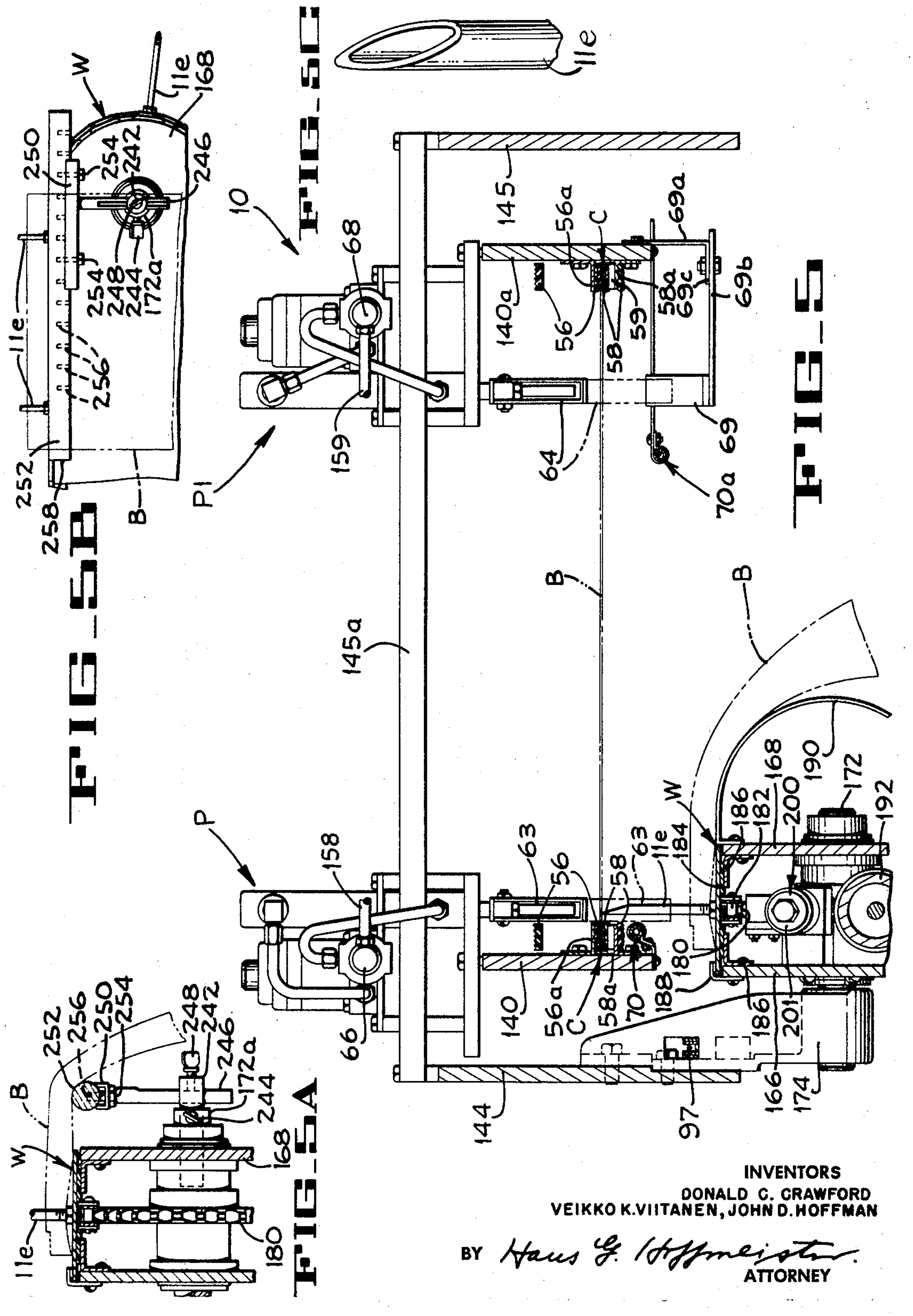
FIGURE 5 is a section taken on lines 5—5 of FIGURE 3.
FIGURE 5A is a fragmentary section like FIGURE 5 showing a modified bag drape device.
FIGURE 5B is a side elevation of the modified drape device.
FIGURE 5C is a fragmentary perspective of a wicket pin.

As seen in FIGURES 5 and 10, static eliminator bars 70 and 70*a* are mounted below the bag conveyors C, to keep the bags from fanning out in the stack. These bars are of conventional design, and include an apertured tube 71 and a central electrode 72, having corona discharge points 73 at the apertures. A high voltage potential is established across the tube and the electrode in the conventional manner (not shown).

Figure 2:
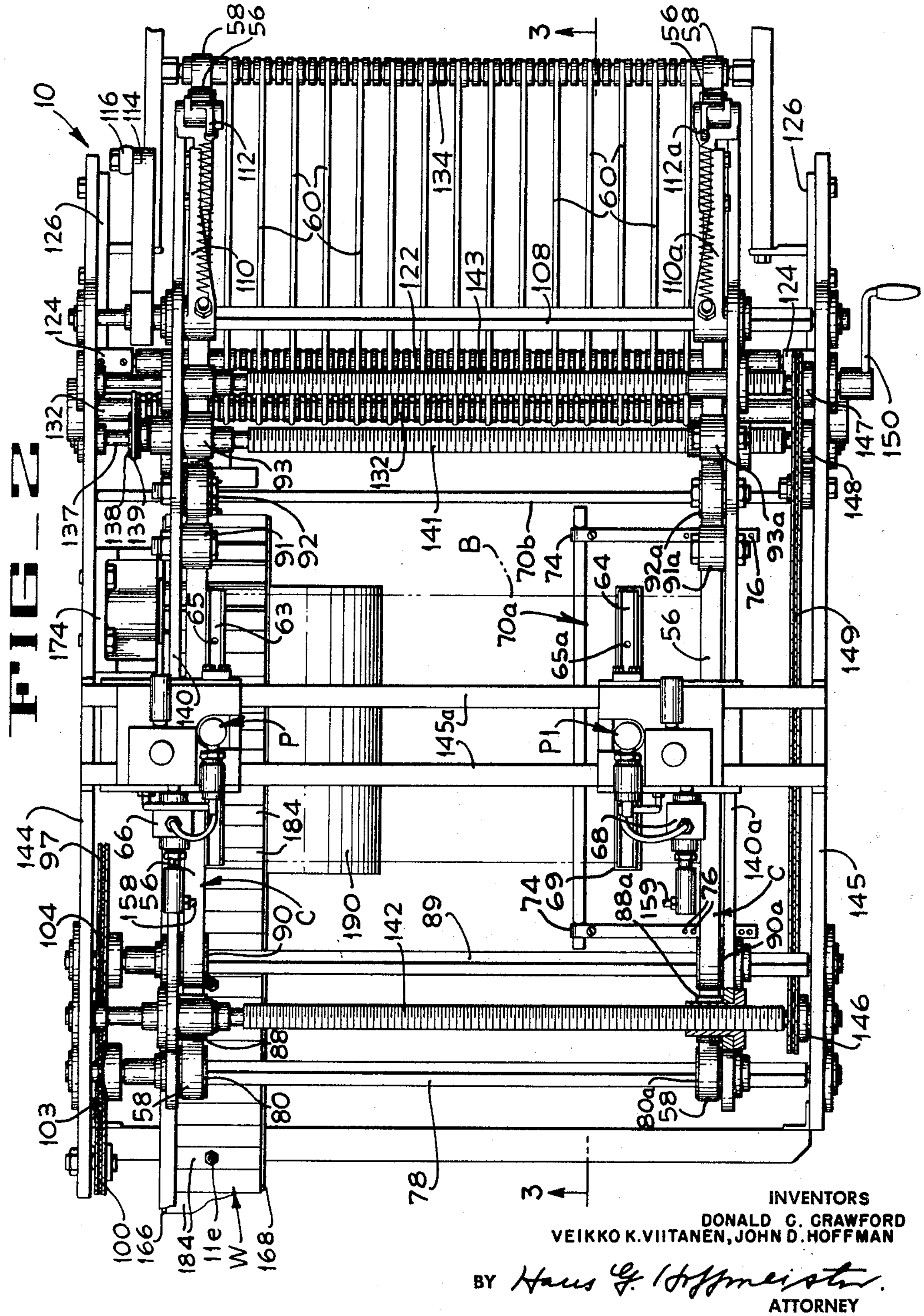
FIGURE 2 is a plan of the bag stacker of the invention, the bag making machine being omitted.

The static bar 70*a* at the near side plunger P1 (FIG. 10) is clamped into a bracket 74 which is adjustably mounted on the lower edge of the near side mounting plate 140*a*, as by spaced holes 76 (FIG. 2). The lateral position of the near side static bar 70*a* is important. As the free ends of the bags slide over the static bar after being released by the plunger foot 64 and the pad 69 if the static bar 70*a* is in the proper lateral position, the bar further removes forces and energy effects which would cause the ends of the bags to turn in.

In order to eliminate electrostatic charges on the bags before stacking, opposed upper and lower static bars 70*b* and 70*c* are provided (FIGS. 2 and 3).

*Belt drives*

Figures 6, 7:
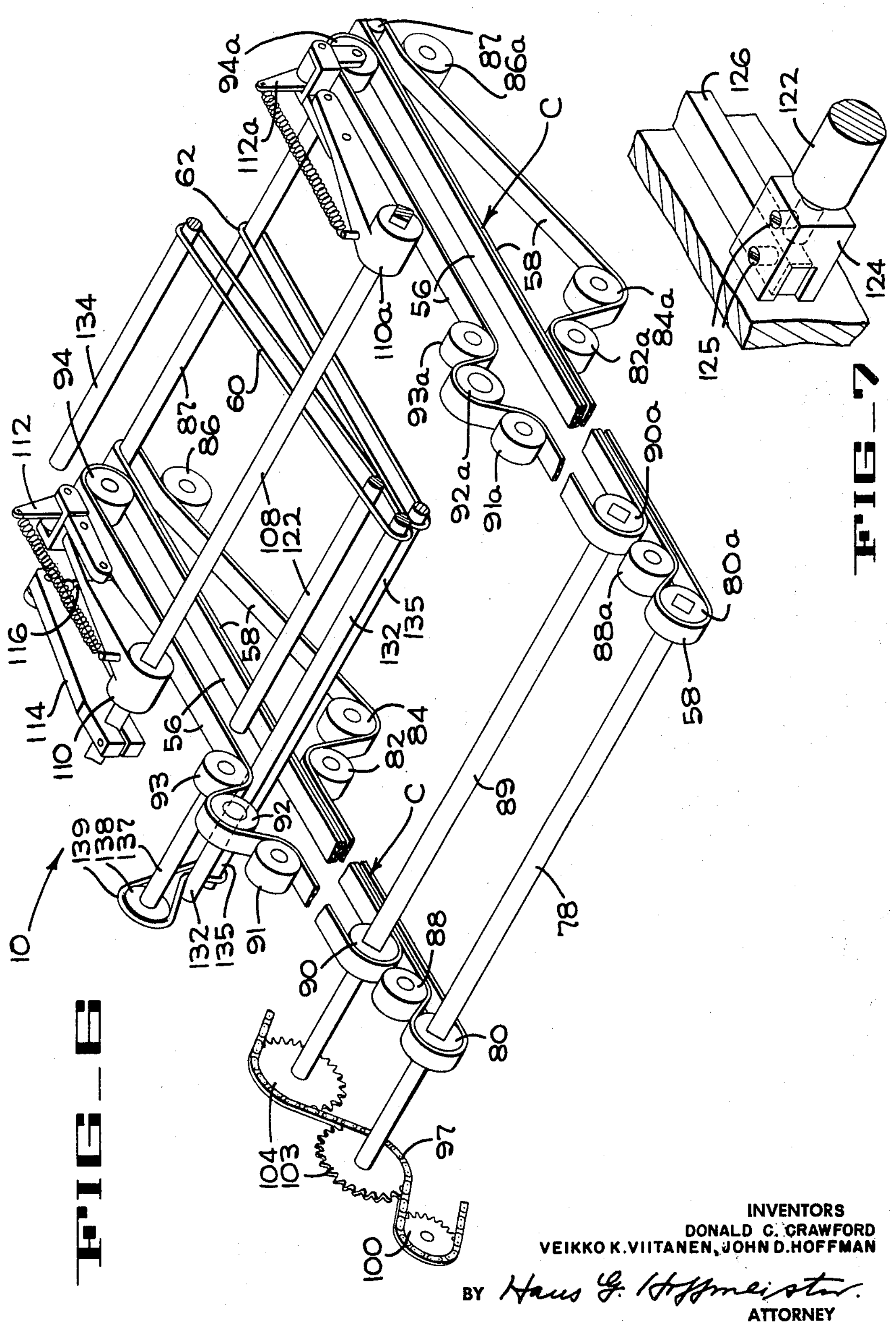
FIGURE 6 is a perspective showing the belt drives for the bag stacker conveyor.
FIGURE 7 is a fragmentary enlarged perspective showing the bag width (longitudinal dimension in the machine) pinch roller adjustment.

The driving arrangement for the upper and lower lead-in belts 60, 62 and the conveyor belts 56, 58 of the conveyor C is best seen in FIGURE 3, and in the diagrammatic perspective of FIGURE 6. The lower ribbed conveyor belts 58 are driven by a squared drive shaft 78 disposed at the delivery end of the conveyor belts. The lower reach of the lower ribbed conveyor belt 58 at the far side of the machine, passes down around a drive roller 80 on the squared shaft 78. The lower reach of the far side lower conveyor belt 58 continues on and passes around intermediate idler pulleys 82 and 84. The lower reach continues and passes over an idler pulley 86 adjacent the input end of the conveyor. The lower reach then passes up and around a shaft 87 at the input end of the conveyor C. The upper (active), bag gripping reach of the far side lower conveyor belt 58 runs in a straight line rearwardly, from the input shaft 87 to an idler roller 88 adjacent the output end of the conveyor. The upper reach of the far side belt 58 then continues up and around the drive roller 80 mounted on the squared drive shaft 78, as previously described.

The drive for the near side lower conveyor belt 58 (as viewed in FIG. 6), is like that for the far side belt except for the fact that the belt is trained around pulleys **80*a*, 82*a*, 84*a*, 86*a*, the input shaft 87 and the rear pulley 88*a***. The pulleys are laterally adjustable for bag length, as will be described presently.

The upper ribbed conveyor belts 56 are driven by a squared drive shaft 89, having a far side drive roller 90. The upper (inactive) reach of the far belt 56 passes around intermediate idler rollers 91, 92 and 93. The upper reach continues on and down around a vertically reciprocable pick-off idler roller 94, at the bag receiving end of the unit. The corresponding rollers at the adjustable, near side of the device are given the same reference characters with the addition of the letter *a*.

Figure 9:
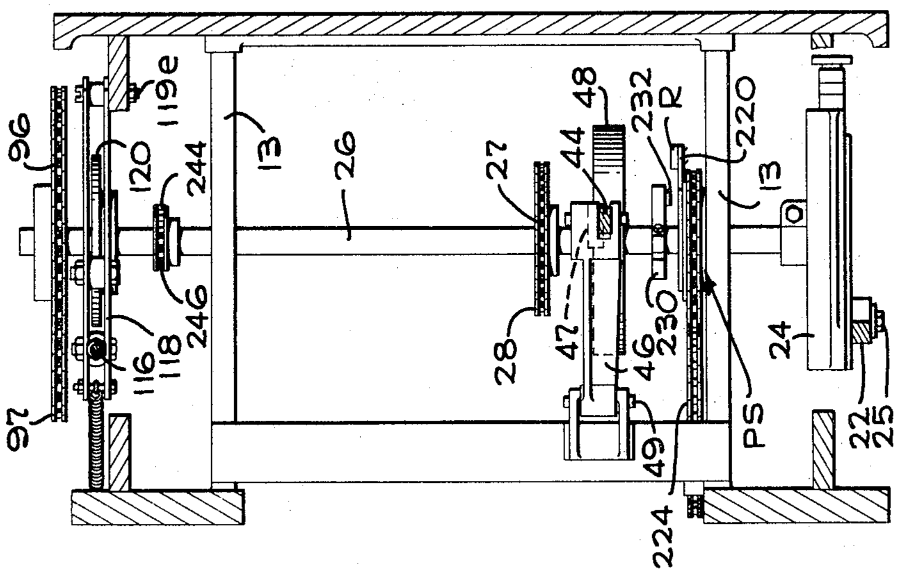
FIGURE 9 is a diagrammatic plan showing the relative disposition of various parts on the master shaft.
Figure 11:
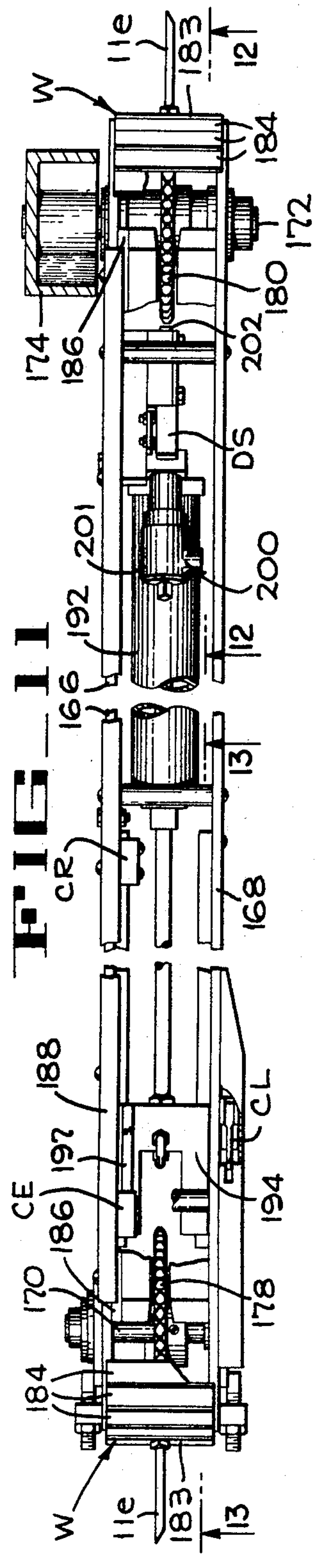
FIGURE 11 is a plan of the indexing wicket conveyor.

As seen in FIGURE 1, the shafts 78, 89 which drive the ribbed conveyor belts 56, 58 are continuously driven by the gear motor M and the master shaft 26. Shaft 26 carries a large sprocket 96 (FIGS. 1 and 9) at the far side of the machine, which drives a chain 97 passing around an idler 100 at the delivery end of the conveyor. The chain 97 continues on and passes under a drive sprocket 103 on the squared drive shaft 78, previously described, for driving the lower ribbed conveyor belts 58. The upper ribbed conveyor belts 56 are driven by the chain 97, as the chain passes up and over a sprocket 104 mounted on the squared shaft 89.

*Pick-off*

As mentioned, a bag pick-off assembly including the pick-off rollers 94, **94*a* for the input ends of the upper conveyor belts 56 is provided. The pick-off assembly receives bags from the bag making machine 12, and causing them to be gripped by the ribbed conveyor belts 56, 58. This assembly includes a squared rock shaft 108, for raising and lowering the pick-off rollers 94, 94*a* (FIGS. 3 and 6). The shaft 108 is mounted upstream of the input ends of the ribbed conveyor belts 56, 58. Arms 110 and 110*a* project rearwardly (toward the bag making machine) from the rock shaft 108 (FIG. 6). The arm 110*a* is slidable along the squared rock shaft 108 for the bag width adjustment previously referred to. The input idler rollers 94 and 94*a* are mounted on the arms 110, 110*a* by means of spring extended tensioning arms 112, 112*a*, best seen in FIGURES 3 and 6. On the far side of the machine, a pick-off roller lifter crank arm 114 projects rearwardly from the outer end of the rock shaft 108**.

The pick-off crank arm 114 is raised and lowered by a generally vertical lifter rod 116 (FIG. 3), the lower end of which is pivoted to a cam follower arm 118 that is operated by a pick-off cam 120 (FIG. 1), the arm 118 being pivoted on a bag machine frame element at **119*e*. The cam 120 is continuously driven from the master shaft 26, previously referred to, so that the input end of the upper conveyor belts 56** are raised for receiving bags, and then lowered to grip the bags.

A laterally extending, longitudinally adjustable pinch roller shaft 122 (FIGS. 2, 3, 6 and 7) is mounted in roller mounting forks 124 (FIG. 7), carrying clamp screws 125. The forks 124 are adjustably clamped in a selected position along a pair of longitudinal fork mounting bars 126. The position of the pinch roller shaft 122 determines the nip point of the belts 56, 58 when the rollers 94, **94*a* are in their raised position. This adjustment is determined by bag width, that is, the dimension of the bags taken longitudinally of the stacker 10**.

As best seen in FIGURES 3 and 6, input roller shaft 87 and the input idler or pick-off rollers 94, **94*a* are longitudinally offset. In the described embodiment, the pick-off rollers, 94, 94*a* are disposed upstream of the input roller shaft 87 for the lower conveyor belts 58. Thus the pick-off rollers 94, 94*a* can be rapidly lowered, and will not damage the bags or the mechanism, if the rollers 94, 94*a* over travel slightly after gripping the bag against the lower belts 58. The lowermost (overtravel) position of the pick-off rollers 94 is shown by the dotted lines in FIGURE 3. The pick-off rollers 94, 94*a* can thus be lowered so rapidly that the duration of the actual, effective pick-off time is extremely short. In other words, the elapsed time between initial engagement of the bags by the pick-off rollers, and effective, gripping engagement is extremely short. This, in turn, minimizes any side to side differences in pick-off. The practical result is that the articles are picked off square, that is, they all will be correctly positioned over the impaling (wicket) pins 11*e***, downstream of the pick-off rollers.

The lead-in bag supports and guide belts 60, 62 are continuously driven O-ring belts. A grooved drive roller 132 (FIGS. 2, 3 and 6) is provided for the upper O-ring belts 60, which belts are also trained around a grooved input idler shaft 134. The lower O-ring belts are driven by a grooved shaft 135. The intermediate portion of shaft 87 is grooved to receive the lower O-ring belts 62. The shaft 87 also serves as the input idler shaft for the lower ribbed conveyor belts 58, as previously described. Also, as previously mentioned, the shaft 87 is rearward of the idler rollers 86, **86*a* for the lower conveyor belts 58, to provide instant gripping of the bags when the input rollers 94, 94*a* for the upper ribbed conveyor belts 58** are rapidly lowered.

In order to drive the O-ring belts 60 and 62, a countershaft 137 is provided on the idler pulley 93 previously referred to (FIG. 6), and the countershaft 137 mounts a drive pulley 138 that drives an O-ring drive belt 139. The drive belt 139 frictionally engages the grooved drive shafts 132, 135 for the lead-in and support O-ring belts 60 and 62.

*Bag length adjustment*

Means are provided for bag length adjustment, that is, the dimensions of the bags taken laterally of the machine. For this purpose a mounting plate **140*a* is slidably mounted on shafts 78, 88, 108, etc., and rotatably mounts the various pulleys 80*a* to 94*a* previously described. The arm 110*a* that mounts the idler pick-off roller 94*a* is likewise mounted on the slidable plate 140*a*, as is the plunger assembly P (FIG. 5). A companion, fixed mounting plate 140 is provided on the wicket conveyor side of the apparatus. In order to shift the adjustable plate 140*a*, adjusting screws 142, 143 and 141 are rotatably mounted in side plates 144, 145 of the machine. Cross bars 145*a* connect the side plates (FIG. 2). In order to simultaneously turn the adjusting screws 142, 143, and 141, they carry sprockets 146, 147 and 148, respectively, and are driven by a common chain 149 and a crank 150 (FIGURES 1 and 2), which crank is mounted on the end of screw 143. Rotation of the crank 150 in one direction or the other causes the chain 149 to turn the sprockets 146, 147 and 148, and their adjusting screws, which shifts the movable side plate 140*a*** in and out for bag length adjustment.

*Stripping plungers*

As mentioned, solenoid valve controlled, pneumatically lowered and raised stripper plunger assemblies P, P1 are provided, just inside the gripper belts 56, 58. The index or wicket conveyor plunger assembly P is supported on the fixed side plate 140 (FIG. 5) and cross bars 145*a.* The other plunger assembly P1 is supported on the adjustable side plate 140*a.* The valve for the plunger P has an air supply line 158, and the valve for plunger P1 has an air supply line 159 and both plungers receive air from a common source 160 (FIG. 25). More details of the pneumatic circuit will be explained presently.

As mentioned, the plunger assemblies P, P1 mount stripper feet 63, 64, and at least the stripper foot 63 is apertured at 65 to clear the wicket pins 11*e* on the wicket conveyor W. As seen in FIGURE 2, only the plunger foot 63 of the far side plunger assembly P need be apertured, because the wicket conveyor W is on that side of the apparatus. However, if the wicket conveyor were mounted on the other side, then the foot 64 for the plunger P1, would be employed, so that this foot also has apertures 65*a.*

*The wicket conveyor*

Figure 15:
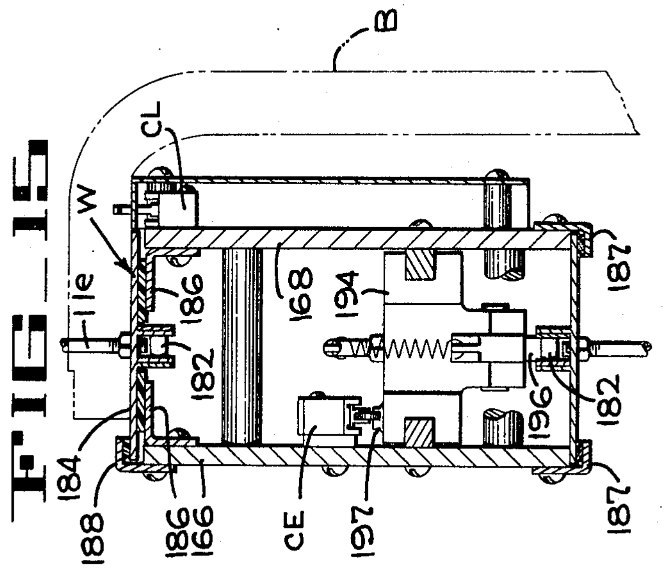
FIGURE 15 is a similar section of the wicket conveyor, taken on lines 15—15 of FIGURE 13.
Figure 14:
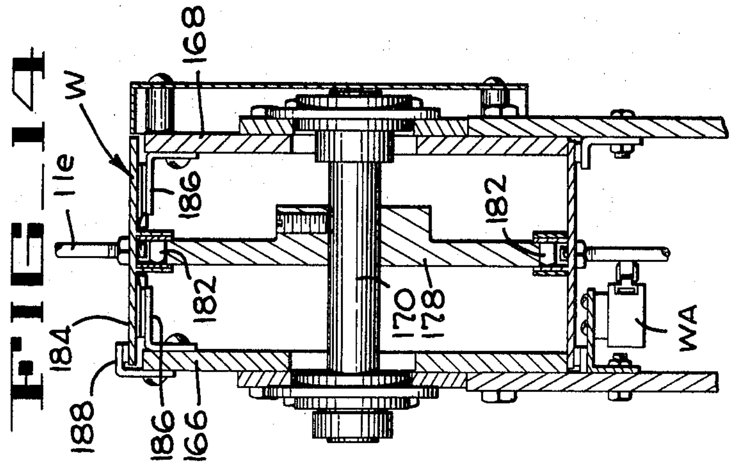
FIGURE 14 is an enlarged section of the wicket conveyor, taken on lines 14—14 of FIGURE 13.
Figure 13:
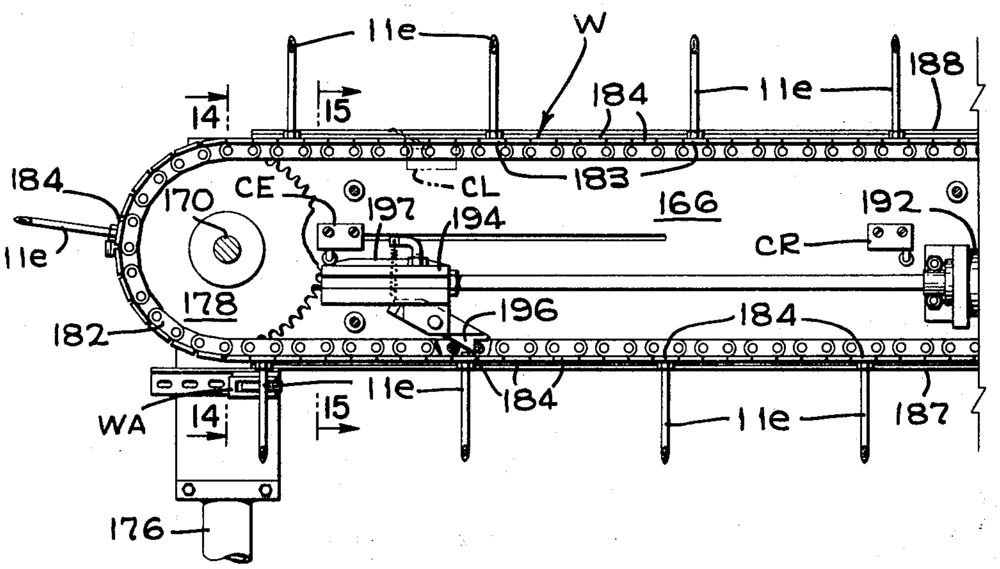
FIGURE 13 is a similar section of the wicket conveyor, taken on lines 13—13 of FIGURE 11.
Figure 12:
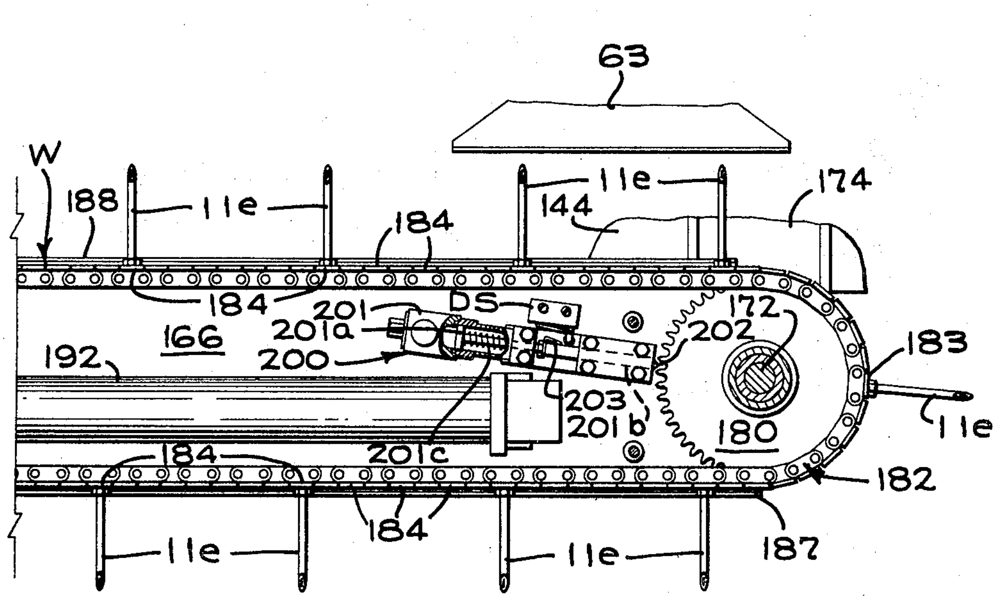
FIGURE 12 is a fragmentary section of the wicket conveyor, taken on lines 12—12 of FIGURE 11.

The wicket conveyor W is best seen in FIGURES 1, 2, 3, 5 and 11–15. The conveyor is mounted between a pair of side plates 166, 168 (FIG. 5) which carry longitudinally spaced shafts 170, 172. Shaft 172 is mounted in a bracket 174 (FIG. 5), which is bolted to the side plate 144 of the machine, to support the bag receiving end of the conveyor. The delivery end of the wicket conveyor W is supported on a pedestal 176 (FIG. 1). Idler sprockets 178, 180 are mounted on the shafts 170, 172, respectively (FIGS. 3, 12 and 13). A roller chain 182 is trained around the sprockets 178, 180 the links of which carry cross plates 184. The tubular, sharpened wicket pins 11*e* project from selected cross plates 184, according to pin spacing. A pair of upper cross plate support rails 186 is provided (FIGS. 14 and 15). A pair of lower cross plate support rails 187 is also provided as seen in FIGURE 15. An upper plate guide rail 188 confines the plates in the upper reach of the wicket conveyor, as seen in FIGURE 15. An apron 190 (FIGS. 3 and 5) is provided at the plunger assembly P, over which the stack of bags drape after being impaled on the wicket pins 11*e.*

The wicket conveyor W is indexed automatically when the pair of wicket pins 11*e* that lie underneath the plunger assembly P have received a predetermined number of bags, as counted by a pulse-controlled predetermining counter. As will be described presently, during the indexing operation, the clutch brake unit 20 of the bag making machine is locked on brake, and solenoid valves 66 and 68 for the plunger assemblies, P, P1 (FIGS. 16–22), are held de-energized. Also the bag making machine web drive motor (not shown) is stopped by a contact forming part of the control system. The indexing of the wicket conveyor chain 182 is performed by a fluid operated linear actuator in the form of a double acting pneumatic index piston and cylinder assembly 192, which has an eighteen inch stroke, and which carries a wicket conveyor pawl to be described. The cylinder assembly 192 includes a dual solenoid valve 193 (FIG. 24), and is a dual solenoid, pulse-controlled, rear cushioned cylinder, of conventional design, and the design details thereof form no part of the present invention. A typical cylinder assembly, suitable for use in the apparatus of the present invention is an Air Motor Model DEMCR–5C, manufactured by the Bellows Company of Akron, Ohio.

At the end of the piston rod of the index cylinder assembly is an actuator head 194, which carries a rachet pawl 196, for engaging the rollers of the chain 182, and a double acting switch actuator cam 197. The control switches associated with the wicket conveyor include an adjustably mounted "Cylinder Retracted" switch CR (FIG. 13), and adjustably mounted "Cylinder Extended" switch CE, a "Wicket Aligned" switch WA, and a "Conveyor Loaded" switch CL. The manner in which these switches are connected to the automatic control circuit will be explained presently, in connection with FIGURES 16–22.

A detent assembly 200 is provided to precisely lock the wicket conveyor W in its final, indexed position, which insures that the wicket pins 11*e* are precisely aligned with the apertures 65 in the stripper foot 63 of the plunger assembly P. This alignment device 200 (FIG. 12) has a detent, which when fully extended or locked, sets a pulse control counter in operation, for counting each bag, under control of a clutch-brake switch CB (FIG. 16), associated with the clutch and brake assembly 20 (FIG. 1) of the bag making machine 12.

The detent assembly 200 consists principally of a spring retracted, air advanced, solenoid-valve controlled detent cylinder 201 (FIGS. 12 and 24), and a piston 201*a,* having a piston rod 201*b.* When air is supplied to the detent cylinder 201 by energizing the solenoid 200*a* of the associated valve DV (FIG. 24), a detent nose 202 on the free end of the piston rod 201*b* is advanced towards the wicket conveyor sprocket 180, and if the latter is exactly aligned, the nose 202 will enter between two teeth of that sprocket. Any slight misalignment is thus automatically corrected.

The indexing mechanism can only operate in discrete steps equal to the center to center pin spacing of the links of chain 182, because the pawl 196 (FIG. 13) acts on the retract stroke. This provides a non-critical adjustment for the "Cylinder Extended" switch CE, which will function precisely enough within an adjustment range of somewhat less than the link pin center to center spacing.

The stroke of the index cylinder 192, the chain link pin spacing and the number of links or pitches are all selected to provide a maximum number of wicket pin spacings, at a maximum stack storage distance between the stacking station and the "Conveyor Loaded" switch CL, with a minimum wicket conveyor length. For example, with a total of 144 one inch link pitches, an 18" maximum stroke of the index cylinder 192, and a storage distance of 48 inches, to obtain a storage time of three or more indexes, the wickets 11*e* can be bolted to the cross plates 184 at spacings of 4, 6, 8, 12 or 16 inches, the latter being multiples of 48 and 144. The "Cylinder Extended" switch CE need only be set to limit the index cylinder stroke to the extent necessary to bring a new pair of pins in place and in the clear. Wicket pin spacings of 4, 6, 7, 8 and 14 inches can be accommodated with 168 pitches, and 5, 6, 8, 10 and 12 inch spacings are accommodated by 240 pitches, all with at least three index storage or unloading intervals.

A pulse controlled pneumatic cylinder and valve assembly of the type used for the detent assembly is sold as the Han D. Motor, model SAN–1, manufactured by the Bellows Company, of Akron, Ohio. Associated with the detent assembly 200 is a detent position sensing switch DS, which prevents resumption of operation of the bag machine and stacker unless the detent cylinder piston rod is fully locked, which sets up the counter for resumption of counting, as will be described. The switch DS is operated by a cam 203 mounted on the piston rod 201B of the detent cylinder assembly 200.

It is essential that the plungers descend simultaneously at precisely the right time, that they descend rapidly without severe shock, and that all time lags be accounted for. These essentials are obtained by cooperation of an electrical plunger control circuit and unit, and a special pneumatic response circuit. The former will be explained first.

*Plunger control—electrical*

In the present embodiment, the plunger trigger signals are derived from a switch which is timed mechanically from the machine drive. This requires the precisely predictable bag pick-off previously explained. To produce the trigger signal, a plunger switch assembly PS (FIGS. 8 and 8A) is operated by the master shaft 26, and at the proper time, the plunger switch assembly energizes the plunger valve solenoids 66 and 68 (FIG. 16) to strip a bag from the conveyor belts 56, 58, and force the punched end of the bag over the wicket pins 11e. The switch assembly PS includes a disc 210 bolted to the frame 13 by bolts 212. A rotatably adjustable switch mounting sprocket 214 is friction clamped to the disc 210 by a clamp ring 216, and screw assemblies 218. An insulating plate 220 projects from the adjustable sprocket 214, and mounts a magnetically operated reed switch R. The timing of the switch operation is adjusted by means of a chain 224. As seen in FIGURE 1, the chain 224 is trained around a sprocket 226, which is manually adjusted by a knob on the sprocket shaft 226a.

The other half of the plunger switch assembly PS is an arm 230, clamped to the master shaft 26 by a bolt 231. The free end of the arm 230 mounts a magnet 232, which closes the contacts in the reed switch R and energizes the plunger valve solenoids through a plunger control circuit (FIGS. 16–22), for causing the plunger feed to descend. As the rotating magnet 232 clears the stationary reed switch R, the switch reopens ready for the next bag.

Except for the plungers P, P1, which are basically operated by the rotating magnetic switch PS, the units of the stacker are basically controlled by a continuously rotating cycle cam 240 (FIGS. 16–22) mounted on a shaft 242 (FIG. 1). The cycle switch shaft 242 is driven by a chain 244, that is trained around a sprocket 246 (FIG. 9), mounted on the master shaft 26. The function of the cycle switch CB will be explained in connection with a detailed description of the control circuit (FIGS. 16–22), which follows the resume of the mechanical operation of the stacker, next to be described.

MECHANICAL OPERATION

The operation of the mechanical units of the bag machine and stacker which have just been described in detail will now be briefly reviewed, except for the stripper plunger assemblies P, P1, which are basically controlled by the magnetic switch PS, as previously mentioned. The electro-mechanical control for the bag machine 12 and the stacker 10 includes a clutch-brake switch CB (FIGS. 16–22), which is continuously shifted back and forth between the brake and clutch positions by the cycle cam 240. This cam, which is part of the bag machine 12, is continuously driven during normal operation from the master shaft 26, by chain 244 (FIG. 1). Rotation of the master shaft 26 also causes the sealing bar cam 48 (FIGS. 3 and 9), to raise and lower the link 44, through the over-center linkage (not shown), which raises and lowers the transverse sealing bar 34 on the arms 35, as the bag machine operates.

Bags are intermittently fed by the feed rollers 14, 16 under control of the rack and pinion assembly and the adjustable crank shown in FIGURE 4, which in turn is alternately clutched and braked by the clutch and brake assembly 20, on the rack pinion shaft 21 previously referred to. After the sealing bar 34 has descended to cut off and seal the leading side of a bag B, the bag is advanced between the pickoff rollers 94 and 94a which will have been raised by the pick-off cam 120 (FIG. 1). This swings the upper conveyor belts 56 about the pinch roller 122 (FIG. 3). The bags are supported and guided by the rows of O-ring belts 60, 62, as they are carried toward the nip of the conveyor belts 56, 58 at the pinch roller 122.

The bag making machine stops feeding when the strip S has advanced past the cut-off head 34, and the head descends and cuts and seals the trailing edge of the bag. Thus during cut-off substantially the entire bag is supported on the lower O-ring belts 62. The newly severed bag also rests on the forward portions of the lower ribbed grip conveyor belts 58, but these belts merely slide under the bag.

During cut-off, the pick-off rollers 94, 94a of the upper ribbed conveyor belts 56 are descending under control of the pick-off cam 120, and the belt lengths of the upper belts 56 extending between the pinch roller 122 and the pick-off rollers 94, 94a, grip the severed bag just as the cut-off head 34 of the bag making machine 12 begins to rise. As previously mentioned, the disposition of pick-off rollers 94, 94a, rearward of the forward idler shaft 87 (FIG. 3), permits some over travel of the rollers, which in turn facilitates rapid descent of the pick-off rollers 94, 94a.

Soon after the newly severed bag reaches and passes between the nip of belts 56, 58 at the longitudinally adjustable roller 122, the pick-off cam 120 starts to raise the pick-off rollers 94, 94a so that they are opened for receiving the next bag.

The first bag remains trapped between the continuously moving ribbed belts 56, 58 and is carried beneath the plunger shoes of plunger assemblies P, P1. The magnetic switch PS for the plunger solenoids (FIGS. 1, 8, 8A and 9), actuates the plunger valve solenoids, and the plungers rapidly descend, stripping the previously punched bags B from the gripper conveyor belts 56, 58 with the holes in the bags which were punched therein in the bag machine, being slipped down over the two wicket pins 11e disposed underneath the apertured presser foot 63 of the plunger assembly P. Although the conveyor belts 56, 58 may be moving as fast as 400 feet per minute and continuously, the timing control by the magnetic plunger control switch PS is so precise, and the action of the plungers P, P1, so rapid, that the bags are precisely impaled on the wickets, without requiring stopping of the stacker conveyor C.

As will be described in detail presently, the continuously rotating clutch and brake switch cam 240 cycles the clutch and brake 20 for cycling the feed through the bag machine. The circuit also sends pulses to an electrically controlled predetermining counter, which counts down from a predetermined number set into the counter. When the countdown has reached zero, a full stack of bags will have been placed on the wickets 11e underneath the plunger assembly P1, the clutch and brake 20 is electrically locked on "brake," and the feeding of bags from the bag machine is interrupted until the wicket conveyor W indexes. Also the solenoid controls for the valves of plungers P, P1 are de-armed, by the electro-mechanical circuit to be described.

The wicket conveyor index cylinder 192, which will have been fully retracted, is now advanced or extended, dragging the pawl 196 across the rollers of the index conveyor chain 182. When the head 197 of the index cylinder piston reaches its fully extended position, after making a stroke of a length that is determined by the positioning of the adustable switches CR and CE (FIG. 13), switch CE is closed, and the index cylinder is retracted. The pawl 196 now picks up one of the rollers of the index conveyor chain 182, and pulls the lower reach of the chain to the right (as seen in FIG. 13), which advances the stack of bags B under the plunger assemblies by one index increment. This is sufficient to bring a new pair of wicket pins under the presser foot 63 of the plunger assembly P.

After indexing, and after the index cylinder piston has retracted fully, the detent cylinder valve 201 is energized, causing the piston 201a to advance the detent against the force of the detent retract spring, to lock the index conveyor by engaging sprocket 180 as previously described. If the detent nose can enter between teeth on sprocket 180, this means that alignment is precise, and the detent switch DS initiates a new cycle, and restarts the counter, which counter will have been reset to start a new countdown cycle. The wicket aligned switch WA (FIG. 13) provides for coarse alignment, whereas the detent cylinder DS provides for fine alignment. The conveyor loaded switch CL (FIG. 13) is at the last station on the wicket conveyor W. If bags were not removed when they reach this station, they would be carried around and off the end of the conveyor. Hence, as will be seen in connection with FIGURES 16–22, the conveyor loaded switch CL will prevent further indexing of the wicket conveyor, unless the stack of bags B at that station is removed by the operator.

ELECTROMECHANICAL CONTROL

As previously described, the electromechanical control circuit is shown diagrammatically in FIGURES 16–22. In this circuit, details such as voltage transformers, start and stop switches, overload devices, and DC currents supplies (if and when required by specific models of certain elements in the system) are omitted for clarity. These details are not critical to the invention, they are mere engineering conventions.

Figure 16:
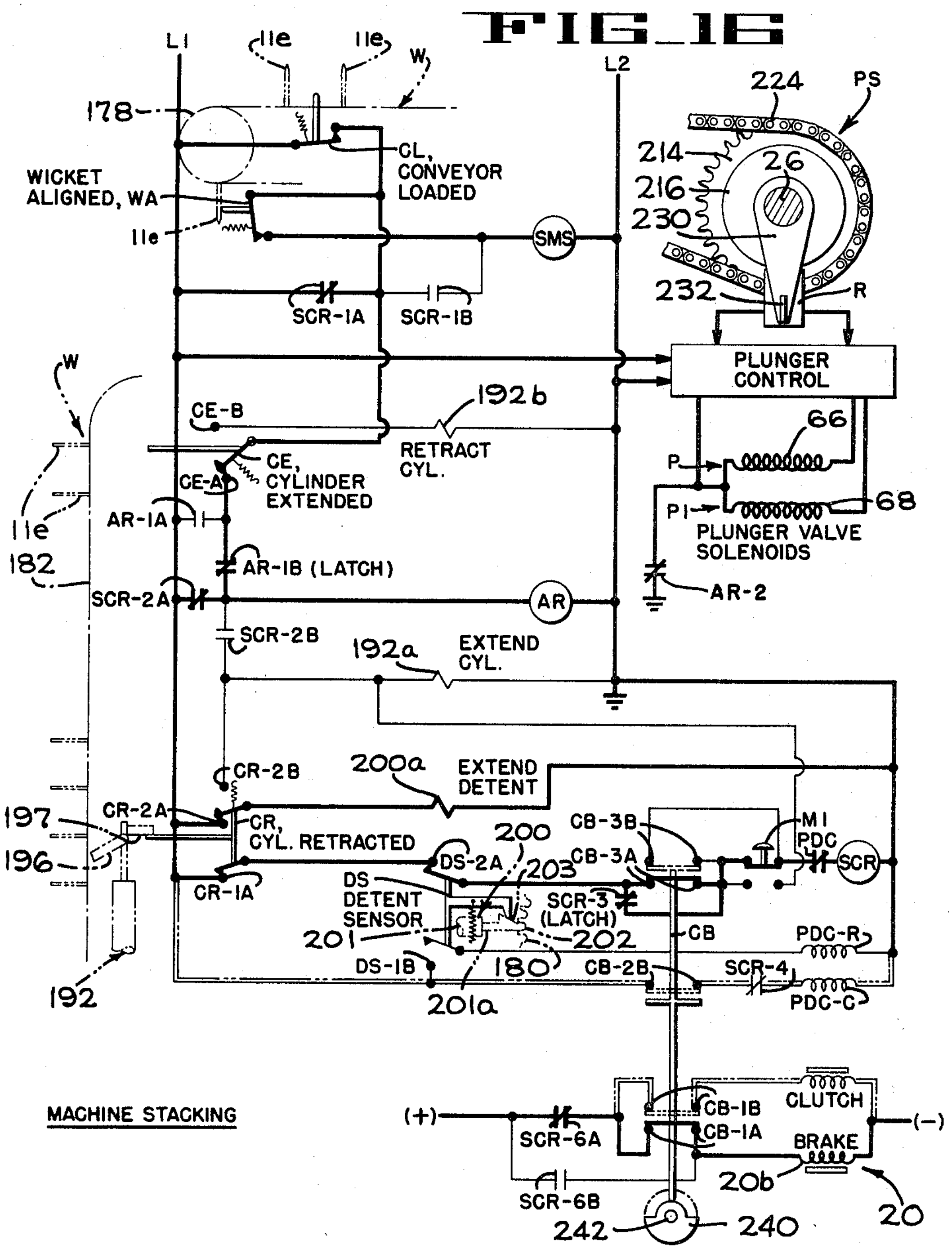
FIGURES 16–22 are schematic diagrams of the electric control circuits in various conditions.

Referring to FIGURE 16, the circuit is shown in the "Machine Stacking" condition. The power lines L1 and L2 are indicated, but the usual start and stop switches, etc., are not shown for simplicity. The "Conveyor Loaded" switch CL is closed, when a stack of bags B (in phantom) which may have been advanced to the final station of the wicket conveyor W has been removed. Also the "Wicket Aligned" switch WA is closed, because a pair of the wickets 11*e* are properly aligned with the apertures in the plunger foot 63 (not shown in FIG. 16).

The head 197 of the wicket conveyor index cylinder assembly 192, is in its retracted position, and the clutch-brake switch CB, which is continuously being shifted back and forth by the rotating cam 240, is shown in its "brake" position. Under these conditions, and with the reciprocable head 197 of the index cylinder 192 retracted, contact CR–2A of a dual set of contacts of the "Cylinder Retracted" switch CR are closed by the head 197 of the wicket conveyor index cylinder assembly 192. This energizes an "Extend Detent" solenoid 200*a*, for the solenoid valve (not shown) that controls the detent assembly 200. The piston 201*a* of the detent cylinder assemblies 200 is pneumatically advanced so that the detent nose 202 is forced between the teeth of the sprocket 180 of the wicket conveyor W. If the sprocket 180 is not exactly positioned to align wicket pins 113 under the presser foot 63, the detent nose 202 completes the alignment. When the detent nose 202 locks in, the cam 203 on the piston of the detent cylinder assembly 200 operates a dual "Detent Sensor" switch DS. This closes detent sensor switch contact DS–2*a*, it being noted that the "Cylinder Retracted" contact CR–1A of the "Cylinder Retracted switch CR is also closed, because the wicket conveyor index cylinder 192 is retracted, as explained above.

Contacts CB–3A of the clutch-brake switch CB are closed, when the clutch brake unit 20 is in "brake," as shown in FIGURE 16. This completes a circuit through the normally closed manual index switch M1, and a normally closed contact PDC, which is a predetermining counter contact, and which forms part of the electrically controlled counter. The predetermining counter contact PDC will have been automatically closed within the counter (not shown), at this time. A circuit is now completed through the stacker control relay coil SCR to the line L2, energizing the coil SCR. A set of contacts SCR–2A (left center of FIGURE 16) connected to line L1 and to an arming relay coil AR are now closed, which energizes the arming relay coil AR, for permitting operation of the bag plunger valve solenoids, under control of the magnetic plunger switch assembly PS.

Energization of the arming relay coil AR closes contacts AR–1B in a holding circuit for the arming relay coil AR. Energization of the arming relay coil AR also closes contacts AR–2 (upper right in FIG. 16) in the plunger valve solenoid circuit, placing control of the valve solenoids 66, 68 for the plungers P, P1 under the continuously running magnetic switch assembly PS, operated by the master shaft 26. The plunger control received AC power from lines L1 and L2 and electric impulses from the reed switch assembly R. The reed switch triggers the plunger control to provide DC for the plunger valve solenoids 66, 68. The rectifier amplifier circuit of the plunger control is of conventional design, and its details are not part of the invention.

The stacker motor starter solenoid SMS is also closed initially from line L1, through a series connection of the normally closed "Conveyor Loaded" switch CL and the "Wicket Aligned" switch WA, the latter being closed by a wicket 11*e*. A contact SCR–1A of the stacker control relay SCR, which shunts switch WA is also closed because the coil SCR has been energized, but this is a holding contact for SMS, and its closure at this time has no effect. However, if a stack of bags B has not been removed from the final wicket conveyor station, switch CL is opened by the bags, and although the stacker motor M (FIG. 1) continues to run, indexing of the wicket conveyor cannot proceed.

In an instant, cam 240 rotates to throw the clutch-brake switch CB into the "clutch" position (in phantom), starting feeding of a bag through the bag machine and into the stacker. During reciprocation of the clutch-brake switch CB, the stacker control relay SCR will be held latched by a latch contact SCR–3, the series connected manuel index switch MI, and the counter contact PDC, which remains closed during a stacking cycle. When the clutch-brake switch goes to the "clutch" position (in phantom), contacts CB–2B are closed, which energizes the predetermining counter coil PDC–C through a contact SCR–4 of the stacker control relay SCR, the contact SCR–4 having been closed when the relay SCR was energized. Thus the counter coil PDC–C counts on each clutch stroke, and it counts down one bag from the number previously found in the counter.

Details of the predetermining impulse counter referred to are not shown because they are standard elements available to the trade, and such details are not critical to the present invention, except insofar as the electrical elements thereof are incorporated in the diagram being described. A counter suitable for this surface is a Sodeco Counter, type TCEF4PE, with manual and electric reset. These counters are manufactured in Geneva, Switzerland and are distributed in the United States by the Landis & Geyr Inc., New York City. During a stacking cycle, the bag making, feeding, conveying by the stacker, stripping and impaling onto the wickets are under control of the clutch-brake switch CB, and the magnetic plunger switch PS, with the counter contact PDC closed, and the Stacker Control Relay SCR energized. As described, the bag stacking cycle action continues until the predetermining counter counts down to zero. At this time the circuit conditions are switched to those illustrated in FIGURE 17 of the drawings, to which reference is now made.

When the predetermining counter counts down to zero, the predetermining counter contact PDC opens and drops out the Stacker Control Relay SCR. The clutch-brake switch CB will have been on "Brake," and when the Stacker Control Relay SCR drops out, a previously open contact SCR–6B closes. This bypasses the clutch-brake switch contacts CB–1A in the clutch-brake circuit, and latches the clutch-brake switch on "Brake," irrespective of the action of the cam 240. Also, a contact SCR–6A in series with the contacts CB–1B in the clutch-brake circuit, which contact SCR–6A was formerly closed to give control to the clutch-brake switch CB, is now opened. Thus when the "Stacker Control" SCR relay drops out, the "Stacker Control" relay contact SCR–6A disarms the clutch coil of the clutch-brake unit 20.

As to the stacker drive motor M (FIG. 1), with the

"Stacker Control" relay SCR dropped out (FIG. 17), the previously closed contacts SCR–1B formerly open, are now closed, by passing the "Wicket Aligned" contact WA, in the circuit for the stacker motor solenoid SMS. The stacker motor starter relay SMS remains energized through CL and SCR–1B, provided no stack of bags B is at the final wicket conveyor station.

The arming relay AR is still energized through the "Conveyor Loaded" switch CL, the "Cylinder Extended" switch CE, and the latch contacts AR–1B.

Since SCR drops out, the stacking control relay contacts SCR–2B in the "Extend Cylinder" circuit, which contacts were formerly open, now close. This completes a circuit to the "Extend Cylinder" solenoid 192*a* from line L1, through CL, the contacts CE–A of the "Cylinder Extended" switch CE, the arm relay latch contacts AR–1B and SCR–2B (just closed) to the line L2. This directs air to the indexing cylinder assembly 192 for extending it preparatory for indexing of the wicket conveyor W.

Figure 17:
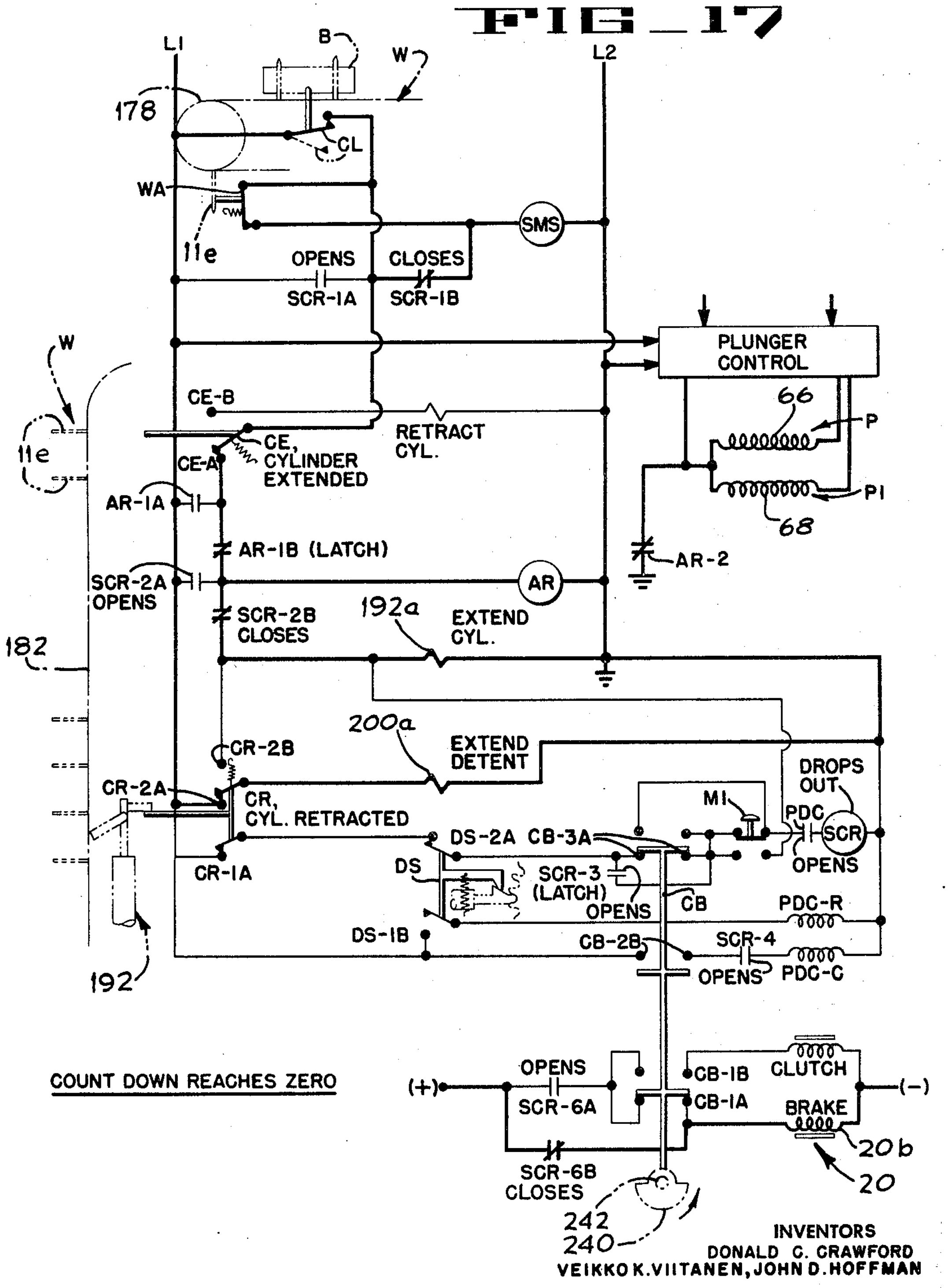

If the stack of bags is not removed from the last wicket conveyor station, as shown in phantom in FIGURE 17, the "Conveyor Loaded" switch CL will interrupt the power circuit to the motor starter relay switch SMS, and to the "Extend Cylinder" solenoid 192*a*, and indexing, which would drop the stack on the floor cannot take place.

Figure 18:
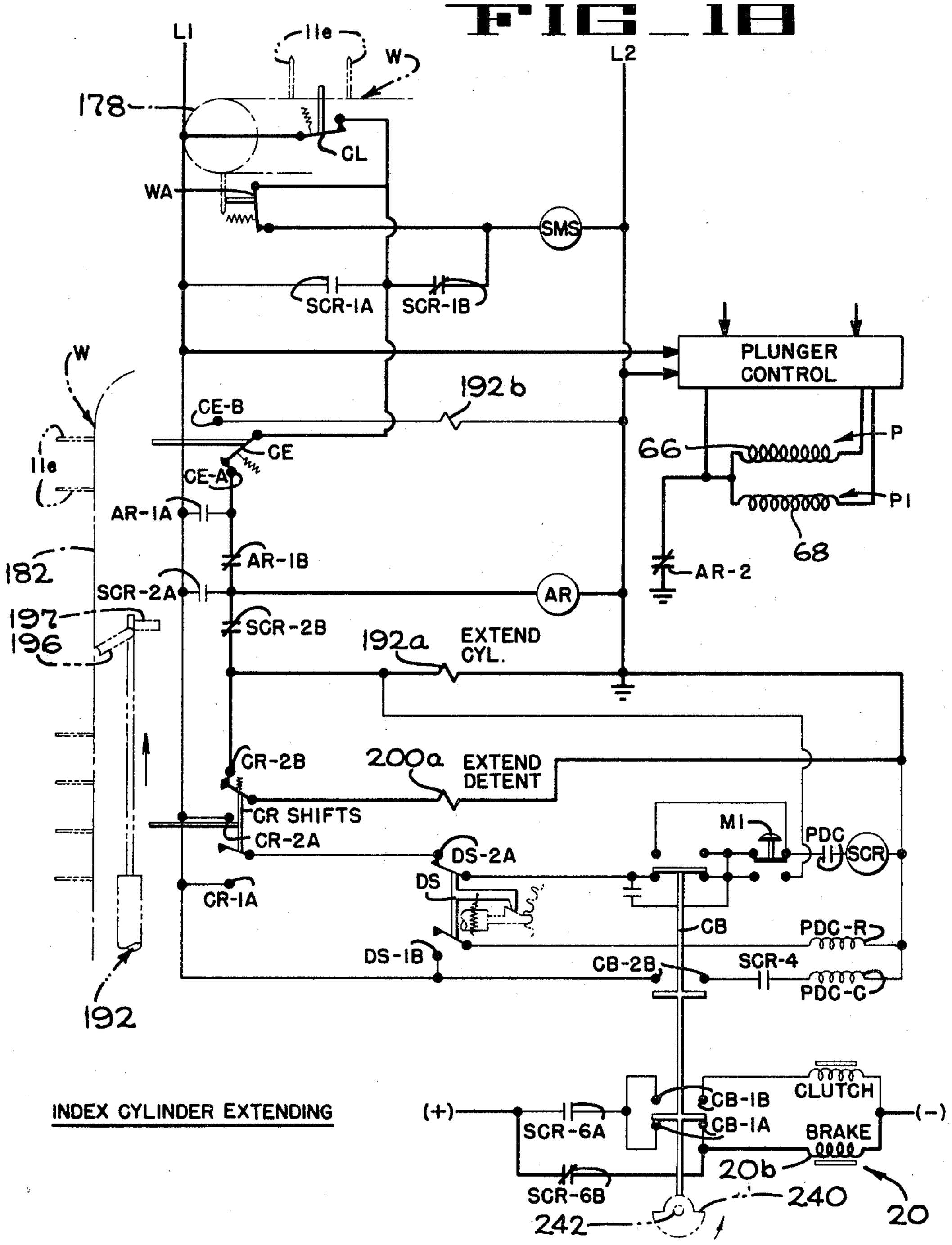

FIGURE 18 shows the circuit during extending or advance of the piston of the wicket conveyor indexing cylinder assembly 192. When the index cylinder piston starts to extend, the cam head 197 on its piston clears the "Cylinder Retracted" switch CR, so that contact CR–2A, which was formerly closed, is now open, and contact CR–2B, formrely open, is now closed. The "Extend Detent" solenoid 192A remains energized, but its power path is now L1, CL, CE–A, AR–1B, SCR–2B, CR–2B, the "Extend Detent" solenoid, 192A remains energized, but its power path is now L1, CL, CE–A, AR–1B, SCR–2B, CR–2B, the "Extend Detent" solenoid, and line L2. The detent nose 202 (FIG. 12), continues to lock the wicket conveyor chain 182, while the pawl 196 on the index cylinder piston head 197 (FIG. 13), is being pushed rearwardly across the wicket conveyor chain 182, during extension or advance of the wicket conveyor piston head 197.

Figure 19:
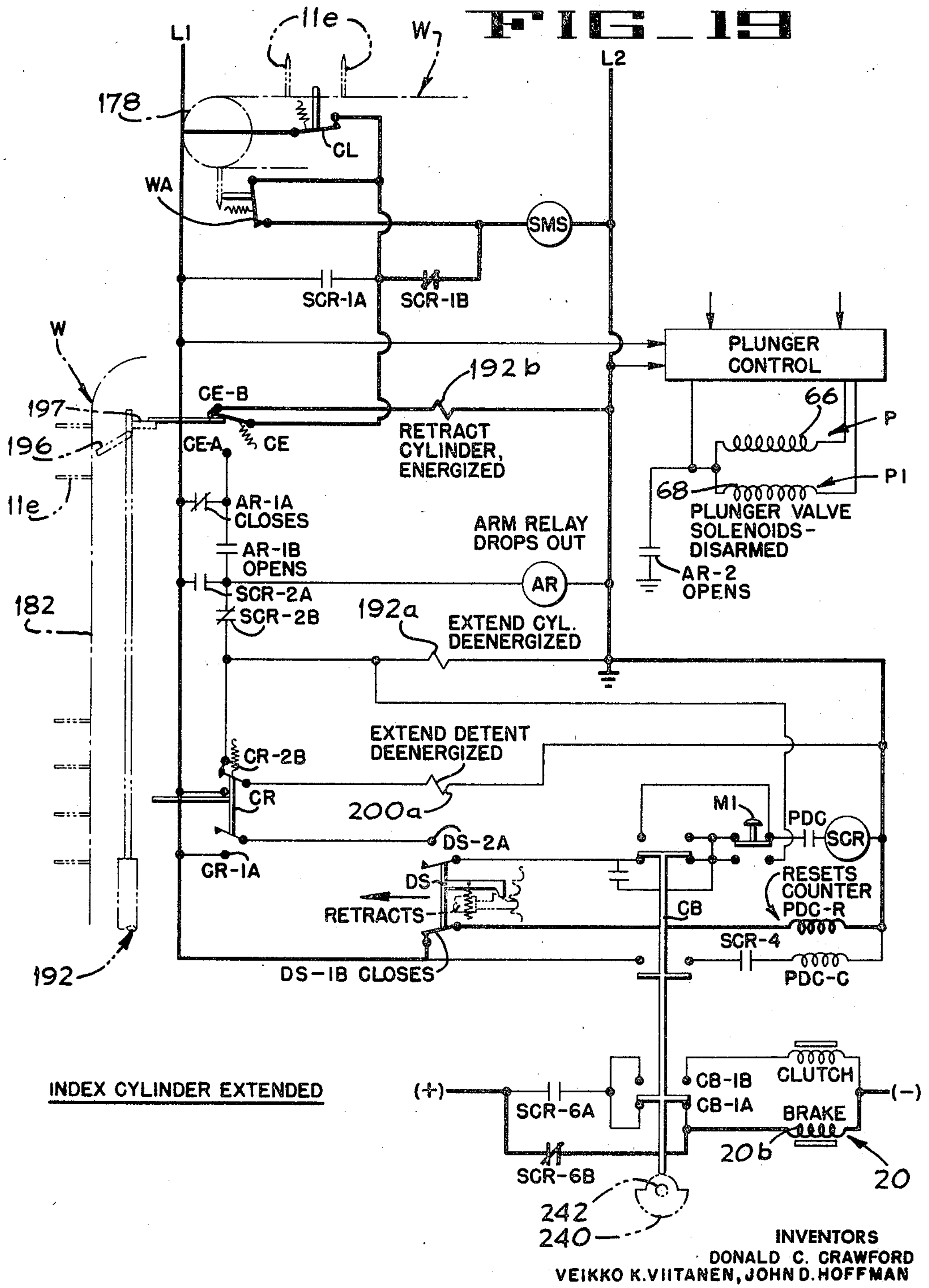

FIGURE 19 shows the circuit conditions when the index cylinder piston is fully extended. The contact CE–A of the "Cylinder Extended" switch CE, which was formerly spring closed, is now opened by the cam head 197 on the index cylinder piston (FIG. 13). Simultaneously, the contact CE–B of the "Cylinder Extended" is closed. This energizes the "Retract Cylinder" solenoid 192*b*, which controls the valve for the wicket conveyor index cylinder 192, and shifts the valve to direct air to cause the index cylinder piston head 197 to retract. Opening of the contacts CE–A of the "Cylinder Extended" switch CE, deenergizes the power path just described leading to the "Extend Detent" solenoid 200*a*. This shifts the solenoid operated valve in the extend detent cylinder assembly 200, to cut-off the air supply to the detent cylinder 201. Since the detent cylinder piston is spring loaded to its retracted position by spring 201*c* (FIG. 12) the detent piston 201*a* retracts, and the detent nose 202 clears the teeth of the wicket conveyor sprocket 180.

The wicket conveyor chains 182 (FIGS. 12 and 13) are now free to be indexed by the wicket conveyor indexing cylinder assembly 192, when the piston head 197 is retracted. The clutch-brake 20 is still locked on "brake" by energization of the brake coil 20*b*, through the contacts SCR–6B. These contacts were closed when the stacker control relay SCR dropped out, as previously explained. The arming relay AR also drops out, due to the opening of the contacts CEA of the "Cylinder Extended" switch CE. This opens contacts AR2 of the arming relay AR, in the supply line to the solenoids 66, 68 of the valves for the plungers P, P1, so that the plunger assemblies are disabled during indexing of the wicket conveyor.

Figure 20:
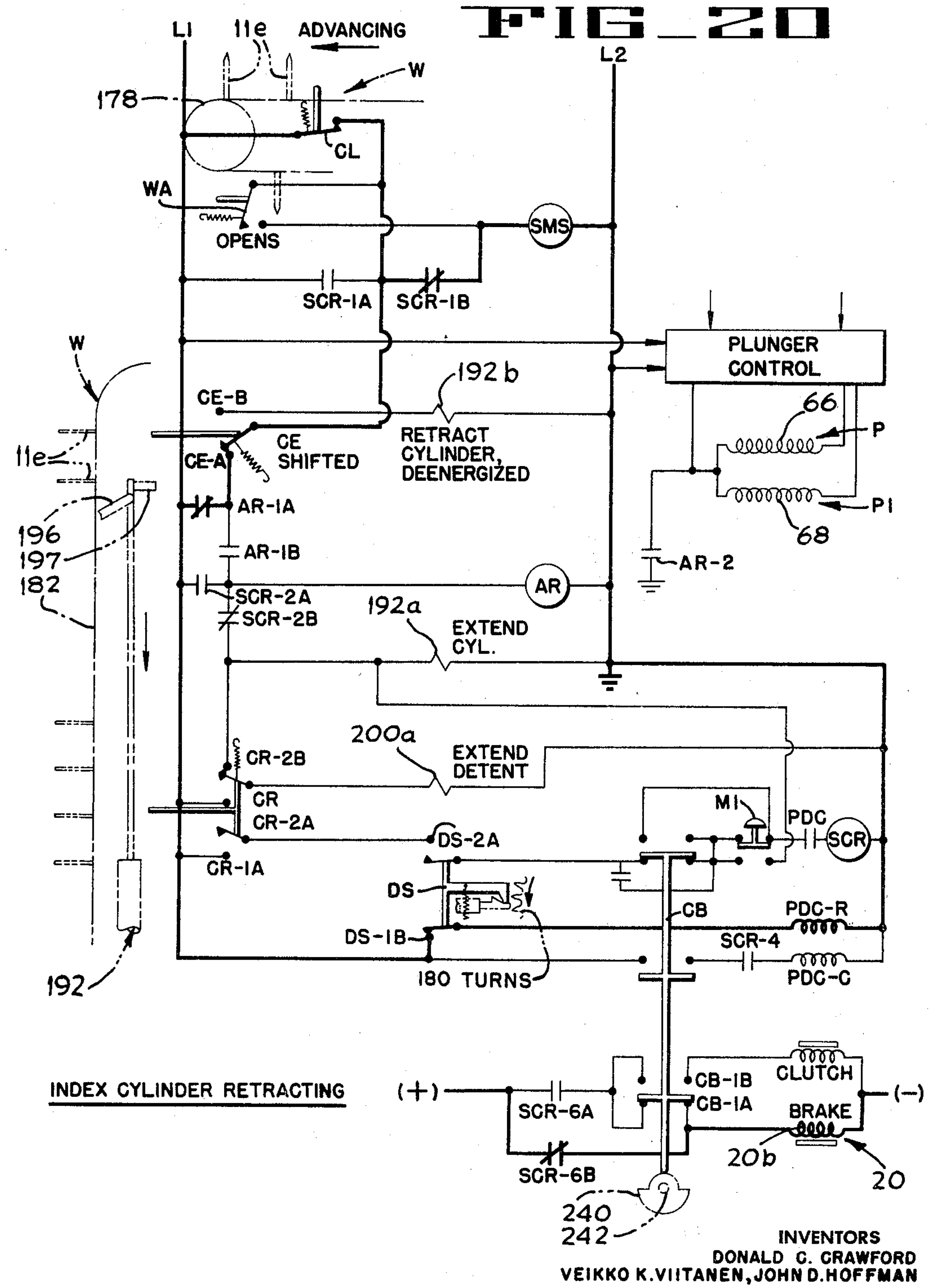

In FIGURE 20, the piston of the wicket conveyor indexing cylinder assembly 192 is shown retracting. The pawl 196 on the piston is now dragging the chain 182 of the wicket conveyor W with it. As the pawl is retracted, and when the head 197 clears the "Cylinder Extended" switch CE which is shifted, its contacts CE–B are again opened, and its contacts CE–A are again closed. The opening of contacts CE–B deenergizes the "Retract Cylinder" solenoid 192–*b*, but since this is an impulse valve, the retract stroke continues. The arming relay AR, and the stacker control relay SCR, remain dropped out as previously described. With the arming relay AR dropped out, its contacts AR–1A remain closed, completing a power path to the stacking motor starting relay SMS through AR–1A, CE–A, SCR–1B, SMS and L2. The stacker control relay contact SCR–6B keeps the clutch-brake coil 20*b* locked on brake as before, because SCR–6B closed when SCR dropped out.

Figure 21:
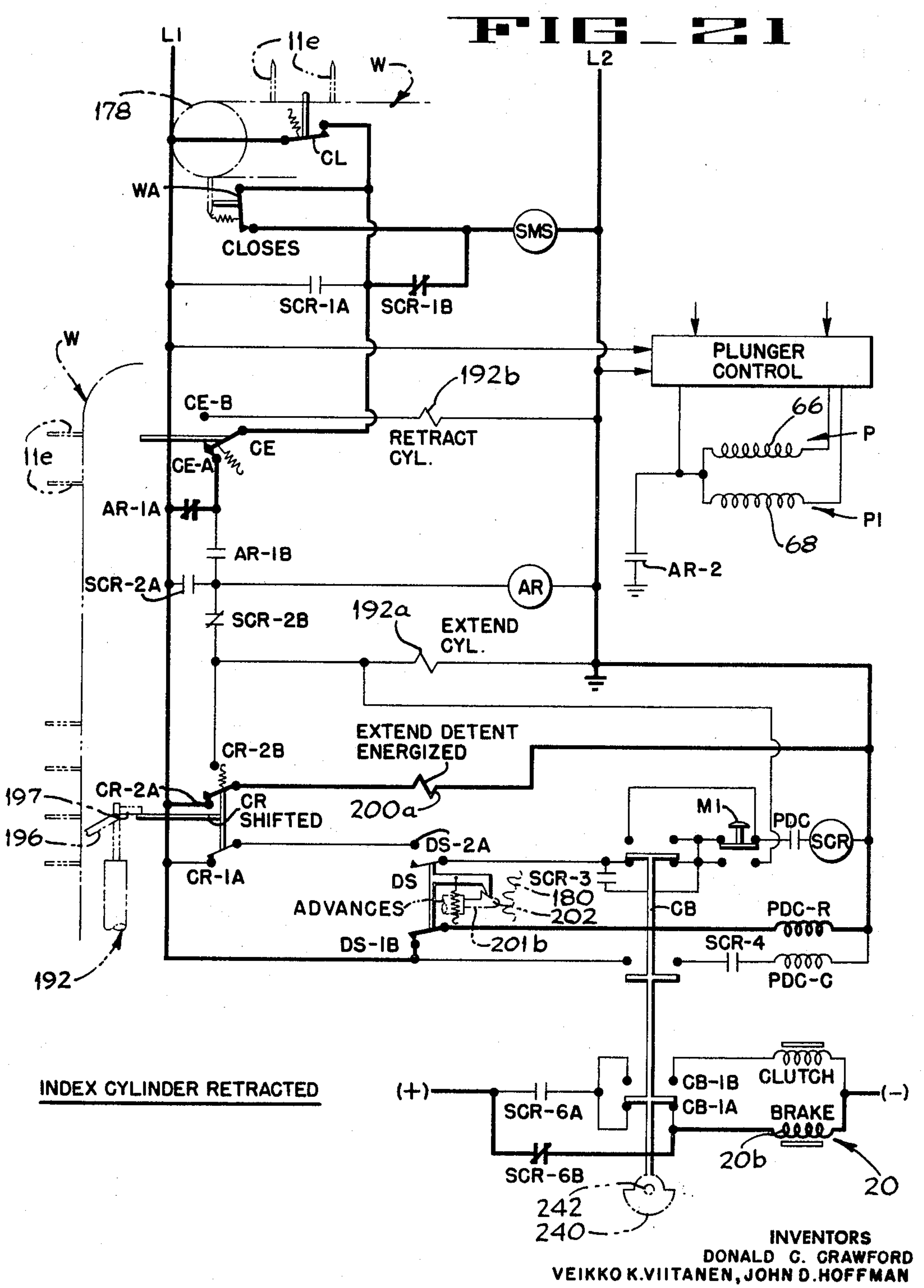

FIGURE 21 shows the circuit conditions when the piston of the wicket conveyor index cylinder assembly 192 has fully retracted, so that the wicket conveyor has advanced for a new stacking cycle. The normally open contact CR–2A of the "Cylinder Retracted" switch CR is now closed by the index cylinder head 197, which energizes the "Extend Detent" valve solenoid 200*a*, connecting air to the detent cylinder, and urging its piston 201*a* (FIG. 12) toward the sprocket 180 of the wicket conveyor W. At the completion of the wicket conveyor indexing stroke, the "Wicket Aligned" switch WA will again have been closed. With the index cylinder head 197 fully retracted, contact CR–1A of the "Cylinder Retracted" switch CR will be reclosed, setting up the circuit for reenergizing SCR, but this will have no effect unless the conveyor sprocket 180 is perfectly aligned, so as to permit the detent nose 202 to latch the sprocket, with cam 203 shifting the "Detent Sensor" switch DS (FIG. 12). Contact CR–2A of switch CR is also closed, energizing the "Extend Detent" solenoid 200*a*, for advancing the nose 202 of the detent toward the sprocket 180.

The drive motor starter relay SMS remains energized through L1, AR–1A, CE–A and SCR–1B, the latter contact having been closed when SCR dropped out at the zero count down for the preceding stack of bags (FIG. 17). Thus the drive motor runs independently of switches CL and WA so long as SCR and AR are de-energized.

Figure 22:
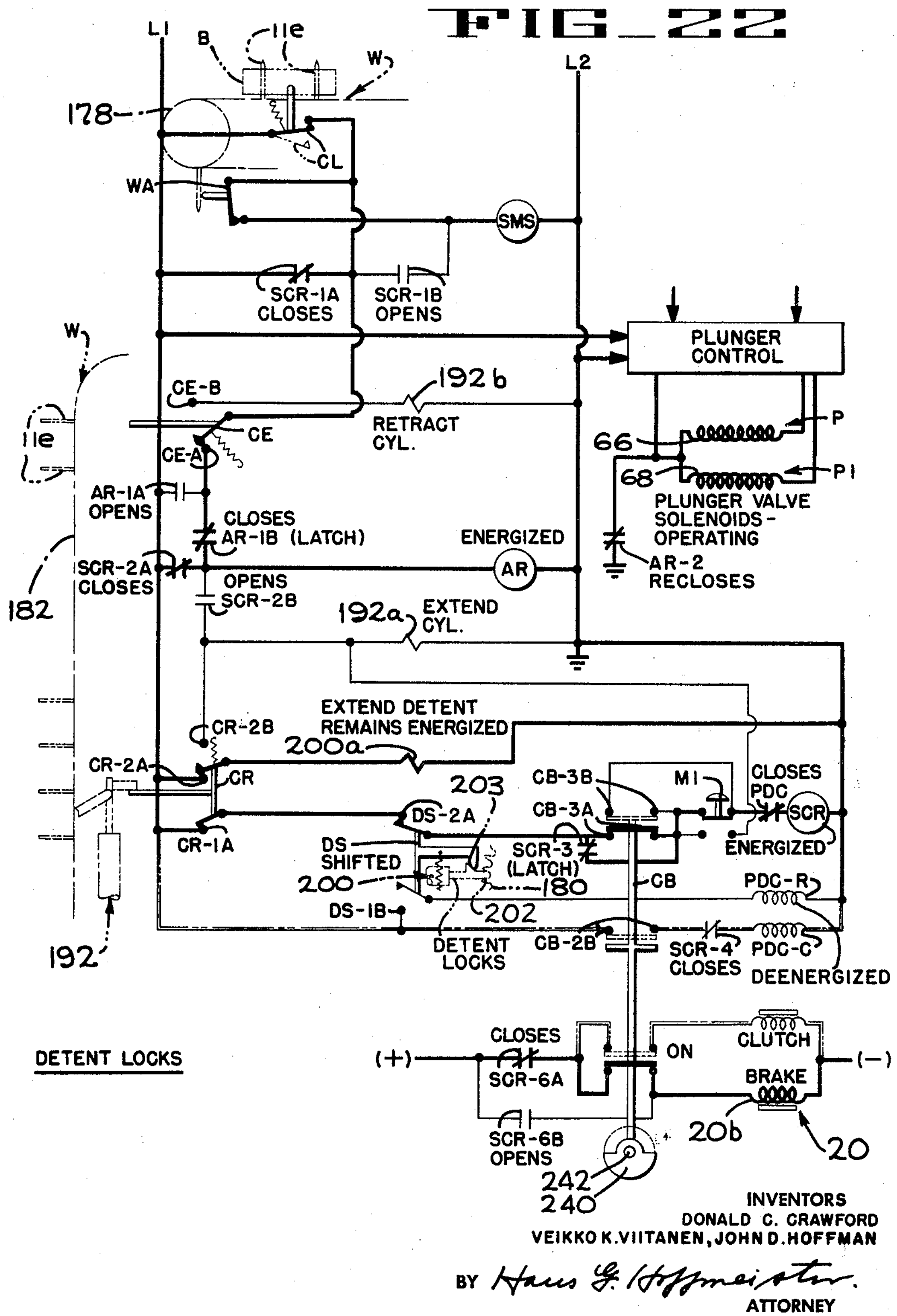

FIGURE 22 shows the circuit conditions with the sprocket 180 of the index conveyor W perfectly aligned, and with the detent cylinder nose 202 extended between a pair of sprocket teeth. The "Extend Detent" solenoids 200*a* remains energized through contact CR–2A to hold the nose extended against the spring 201*c* (FIG. 12), and the contact DS–2A of the detent sensor switch DS is closed by the detent cam 203. Simultaneously, the contact DS–1B of the detent sensor switch DS now opens, de-energizing the reset coil PDC–R of the counter. When the reset coil PDC–R is again de-energized, the normally closed predetermining counter switch contact PDC in the circuit for the "Stacker Control" relay SCR recloses due to mechanism in the counter, and the circuit is set up for energizing the relay SCR. When the cam 240 has the clutch-brake switch CB in the "brake" position, SCR is energized in the power path L1, CR–1A, DS–2A, CB–3A, M1, PDC, SCR and L2. The "Stacker Control" relay SCR contact SCR–1A in the circuit for the stacker motor starter solenoid SMS now closes, and the contact SCR–1B of the "Stacker Control" relay SCR in the circuit for the stacker motor starter SMS opens. The stacker motor solenoid SMS remains energized through the now closed, serially connected contact SCR–1A of the "Stacker Control" relay SCR, and the "Wicket Aligned" switch WA. The stacker motor solenoid remains energized independent of the "Conveyor Loaded" switch CL.

Also, the contact SCR–4 (lower right) of the "Stacker Control" relay SCR closes. Under these conditions, the circuit for the count down coil PDC–C of the predetermining counter is conditioned so that when the cam 240 places the clutch-brake switch CB in "clutch" (phantom line), the clutch-brake switch contact CB–2B is closed, temporarily energizing the coil PDC–C of the predetermining counter through SCR–4, causing the predetermining counter to count down for the stacking of one bag.

When the cam 240 was on "clutch," as described above, SCR was energized, and the brake latch contact SCR–6B in the line to the brake coil of clutch-brake assembly 20 was opened. Opening of the contact SCR–6B, which is connected between the DC power line and the brake coil of the clutch-brake assembly 20, unlocks the brake, so that operation of the clutch will not be impeded.

During the current stacking cycle, when the "Stacker Control" relay SCR is energized, its contact SCR–2A that is connected between the line L1 and the "Arming Relay" AR is closed, thereby energizing the arming relay. When the "Arming Relay" AR is energized, as described above, the contact AR–1B of the "Arming Relay" AR also closes latching in the arming relay through L1, CL, WA and CE–A. The contact AR–1A, which had kept SMS energized during indexing (FIG. 20), now opens, and SMS is kept energized through SCR–1A and WA, as described.

Also, when the "Arming Relay" AR is energized as described, the arming relay contact AR–2 in the circuit for the plunger valve solenoids closes, setting up the stripper plunger circuit for completion by the magnetic plunger switch PS, when the leading bag reaches the momentarily stationary wickets 11*e* of the wicket conveyor W.

When SCR is re-energized, SCR–1B opens, but SCR–1A closes. The stacker motor M and the arm relay R remain energized, and stacking continues so long as the "Wicket Aligned" switch WA remains closed, and the detent DS is fully advanced too the gear teeth. This is a safety feature to prevent damage to the wickets 11*e* which are under the plunger, in case the wickets are not in registry with the plunger apertures. The stacker motor starter switch remains energized independently of the "Conveyor Loader" switch CL, through SCR–1A and WA. This gives the operator time to remove a stack of bags from the final unloading station of the wicket conveyor, as seen in phantom in FIGURE 22. If these bags are not removed before the end of the new stacking cycle, WA will be open when the countdown reaches zero (FIG. 17).

The cycle of the electrically controlled circuit elements of FIGURES 16–22 is repeated under control of the timer cam 240, until a full stack of bags is provided at the wicket loading station, and the subsequent indexing of the wicket conveyor W, and the stacking of a new stack of bags at the loading station continues, as described in detail above.

THE PLUNGER CONTROL

The plunger control circuit (FIG. 23) accounts for time lags between a trigger signal from switch R and the time that the plunger of cylinder P reaches the tips of the wicket pins 11*e*. The plunger valve solenoids 66, 68 are D.C. operated at twice their rated voltage to shorten the time lag.

The trigger signal from switch R operates an isolation relay 241 to supply a relayed trigger signal to a monostable multivibrator MV of conventional design. After a time determined by a valve signal duration adjustment 242, a plunger valve signal operates a driver stage which power switch in a power switch stage, 243, to supply valve current to a plunger synchronizing potentiometer 243*a*. The adjsutment 242 is a conventional variable RC circuit in the restoring network of the multivibrator. The plunger synchronizing potentiometer is set in the field to insure simultaneous descent of the plungers 63, 64 of P and P1, when contacts AR–2 of the arm Relay AR are closed, as just described. The valve signal duration adjustment is set to restore the multivibrator MV to its normal state while the plungers are descending. This de-energizes the plunger valve solenoids 66, 68 which are spring returned back to their normal plunger retract setting while the plungers are still descending. This permits using an extremely rapid plunger stripping stroke and yet due to the anticipator feature of advanced reversal, eliminates mechanical shock at reversal without requiring buffers which would slow up the cycle.

AIR CIRCUIT

An important feature of the air circuit (FIG. 24) is the use of a conventional quick exhaust valve (FIG. 25) in the retract line of each plunger. As seen in FIGURE 25, air from the lower sides of the plunger cylinder pistons P, P1 bypasses the selector valves 67, 69 operated by solenoids 66, 68 and exhausts directly to atmosphere. This minimizes pneumatic resistance to a rapid stripping stroke. On the retract (lifting) stroke, the pistons of P, P1 are cushioned by a variable flow control valve of conventional design. The latter incorporates a check valve CV for instant passage of air from the associated selector valve 67 or 69 to the upper side of the plungers P, P1. Surge tanks in the plunger air supply lines follow a pressure regulator, and hence provide rapid plunger action without throttling at the regulator.

The wicket index cylinder 192 is advanced and retracted by the dual solenoid pulsed valve 193, set for rear cushioning.

The detent cylinder 201 is operated by the single solenoid, spring return valve *dv*. The symbols of FIGURE 24 are taken from the Machine Design booklet "Fluid Power Book," published by the Penton Publishing Company of Cleveland, Ohio, 1963 edition.

PLUNGER TIME SEQUENCE

A typical timing sequence for 400 ft./min., stacker conveyor operation, using the commercial pneumatic components described and the plunger control system, is as follows:

| | |
|---|---|
| 0 seconds | Trigger signal from switch R. |
| 0.1 milliseconds | Contacts close in relay 241 (Fig. 23) to produce relayed trigger signal to multivibrator. Valve current signal closes power switch 243. Valve current applied to valve solenoids 66, 68. |
| 12.0 milliseconds | Valves 67, 69 start shifting to plunger descent position. |
| 38.0 milliseconds | Multivibrator times out, power switch 243 opens. |
| Do | Plungers 63, 64 start descent. |
| 43.0 milliseconds | Plunger 63 and bag reach tops of wicket pins 11e. |
| 44.0 milliseconds | Current in valve solenoids 66, 68 starts falling. Valves 67, 69 start returning. Descent plunger pressure starts falling. |
| 48.0 milliseconds | Plungers 63, 64 start to reverse. |
| 58.0 milliseconds | Plungers retracting, reach plane of strip S, upper cushioning becomes effective. |
| 63.0 milliseconds | Plungers fully retracted. |

These split second timing steps are made possible by the plunger control valve signal duration adjustment (FIG. 20), the quick exhaust valves (FIGS. 24 and 25) in the plunger retract lines, and the selection of low inertia, high speed pneumatic solenoid valve controlled plunger assemblies P and P1. The above table is an example for a specific stacker feed conveyor speed, 400 ft./min. Other combinations of equivalent equipment can be selected, providing the critical stages occurring at the right times.

When stacking thin articles such as plastic bags, the folds or seams along the sides of the bags, and the weight of the bags as they hang from the pin 11*e* (FIG. 5). tends to curl up the sides of the bags. The sheet metal drape apron 190 (FIG. 5), will reduce the localized stress imparted to the bags at the wicket conveyor pins 11*e* by gravity, and will be adequate to prevent side curl with certain bag sizes and materials. However, it has been found that this important action of the side curl-preventing drape apron 190 is not adequate in some cases, so that an adjustable drape bar assembly shown in FIGURES 5A and 5B is preferred. The wicket conveyor stub shaft 172*a* (FIGS. 5A and 5B) is drilled to receive a laterally adjustable mounting rod 242 held in place by a clamp screw 244. A vertical T-post 246 is adjustably mounted in the rod 242 by a clamp screw 248. The head 250 of the T-post mounts the drape bar 252 for longitudinal adjustment by means of screws 254, and a row of threaded holes 256 formed in the drape bar.

The lateral adjustment (242, 244) of the drape bar 252 is the most critical. If the drape bar 252 is set too close to the wicket conveyor pins 11*e*, the weight of the depending portion of the stack of bags B will be great enough to promulgate side curl. If the drape bar 252 is set too far away from the pins 11*e*, the weight of depending portion of the stack will be too short, and the effect of gravity will not straighten out the stack, and will not prevent excesive fan out of the free end portions of the bags. Thus there is an optimum position of the drape bar wherein the effect of gravity is adequate to straighten out the depending stack, but inadequate to cause side curl.

The longitudinal adjustment (254, 256) of the drape bar 252 is provided in order that the stacks of bags B are supported along their entire ends, but the end 258 of the drape bar (FIG. 5B), does not project appreciably past the sides of the stacks. This insures that the trailing sides of the completed stacks will fall clear of the end 258 of the drape bar upon indexing of the wicket conveyor W.

The vertical adjustment (246, 248) of the drape bar 252 is not as critical, as the lateral adjustment, but in most cases the upper surface of the drape bar will be substantially coplanar with the upper reach of the wicket conveyor W.

In the system just described the plunger control 15 is triggered by a mechanically operated timing switch R for giving a trigger signal to the stripping plunger assemblies P, P1. This assures synchronization of the bag making machine and the stacker when both are mechanically interconnected. As to the stacker itself the timing of the stripping plungers P, P1 could be controlled more directly, e.g., by a device that senses the position of the bags as they pass through the stacker. Since the bags are thin and usually transparent, such a control must be sensitive, and although it is of importance in cases wherein the stacker operates alone, it is unnecessary in the system shown, wherein the bag making machine and the stacker are interconnected.

Having completed a detailed description of a preferred embodiment of the invention so that those skilled in the arc may practice the invention, we claim:

1. Apparatus for stacking thin articles such as bags or the like on pins comprising a continuously moving feed conveyor having means for frictionally gripping opposite edges of the articles, means mounting a plurality of longitudinally spaced, upwardly projecting pins laterally inside of and adjacent to one of said gripping means, an article stripping and impaling plunger normally disposed above said pins, said plunger being apertured to clear the pins, an article stripping plunger inside of and adjacent to the other of said gripping means, actuator means for lowering and raising said plungers to strip articles from said moving feed conveyor and impaling them along one end, and means for energizing said plunger actuator means to lower said plungers when a moving article is positioned over said pins by said continuously moving feed conveyor, wherein said pin mounting means comprises an endless wicket conveyor and wherein said pins are in pairs, means for indexing said wicket conveyor, means for counting the plunger cycles, and control means for actuating said wicket conveyor indexing means and disarming said plunger actuating means when said cycle counting means has counted a predetermined number of articles.

2. Apparatus for stacking thin articles such as bags or the like on pins comprising a continuously moving feed conveyor having means for frictionally gripping opposite edges of the articles, means mounting a plurality of longitudinally spaced, upwardly projecting pins laterally inside of and adjacent to one of said gripping means, an article stripping and impaling plunger normally disposed above said pins, said plunger being apertured to clear the pins, an article stripping plunger inside of and adjacent to the other of said gripping means, actuator means for lowering and raising said plungers to strip articles from said moving feed conveyor and impaling them along one end, and means for energizing said plunger actuator means to lower said plungers when a moving article is positioned over said pins by said continuously moving feed conveyor, wherein a soft, resilient pad is disposed beneath said article stripping plunger, the upper end of said pad being above the lower end of said stripping plunger when the latter is lowered for momentarily trapping the freed ends of the articles.

3. Apparatus for stacking thin articles such as bags or the like on pins comprising a continuously moving feed conveyor having means for frictionally gripping opposite edges of the articles, means mounting a plurality of longitudinally spaced, upwardly projecting pins laterally inside of and adjacent to one of said gripping means, an article stripping and impaling plunger normally disposed above said pins, said plunger being apertured to clear the pins, an article stripping plunger inside of and adjacent to the other of said gripping means, actuator means for lowering and raising said plungers to strip articles from said moving feed conveyor and impaling them along one end, and means for energizing said plunger actuator means to lower said plungers when a moving article is positioned over said pins by said continuously moving feed conveyor, wherein a longitudinally extending drape bar is mounted along side of but spaced laterally inward from the base of said pins at said impaling plunger, and means are provided for adjusting the lateral spacing of said drape bar from the pins.

4. Apparatus for stacking articles such as flattened bags or the like, comprising a continuously moving feed conveyor comprising laterally spaced, longitudinally moving pairs of endless belt gripper conveyors for frictionally gripping opposed side edges of the articles, a pair of longitudinally spaced upwardly projecting pins laterally inside of and adjacent to one of said pair of gripper conveyors, a vertically movable impaling plunger normally disposed above said pins and above an article an article in said feed conveyor, said impaling plunger being apertured to clear the pin, a vertically moving article stripping plunger similarly located at the other pair of gripper conveyors, actuator means for simultaneously lowering and raising said plungers, and means for energizing said plunger actuator means to lower said plungers when an article is substantially centered over said pair of pins by said continuously moving feed conveyor, each gripper conveyor comprising forward belt idler pulleys and rearward belt drive pulleys, and means for momentarily raising and then lowering the upper idler pulley of each pair of conveyors for first receiving and then gripping the articles.

5. The apparatus of claim 4, wherein said upper and lower belt idler pulleys are longitudinally offset for accommodating slight over travel of the upper idler pulleys during lowering of the latter pulleys.

6. Apparatus for producing a stack of flexible articles such as bags or the like comprising article supply means for providing a series of articles, a continuously moving feed conveyor having laterally spaced, longitudinally moving grippers for receiving and frictionally gripping opposed edges of the articles, an endless wicket conveyor running beneath said feed conveyor, a plurality of pairs of longitudinally spaced pins projecting upwardly from said wicket conveyor, laterally inside of and adjacent to one of said grippers, an article stripping station, a vertically movable bag stripping and impaling plunger at said station and normally disposed above said pins, said plunger being apertured to clear the pins, a vertically moving article stripping plunger similarly located at the other gripper, actuator means for lowering and raising said plungers, means for energizing said plunger actuator means to lower said plungers when a moving article is substantially centered over said pair of pins by said continuously moving conveyor, and means for indexing said wicket conveyor when it has received a completed stack of articles at said plungers to advance the stack to an unloading station.

7. The apparatus fo claim 6, wherein said means for indexing the wicket conveyor comprises a linear actuator, a chain drive for the wicket conveyor, a pawl reciprocable by the actuator for engaging chain links and advancing said chain on the retract stroke of the actuator, linear actuator control means for advancing the pawl while it slips along the chain, and control means operated by the linear actuator when extended for retracting the pawl.

8. The apparatus of claim 7, wherein means are provided for disabling said article supply means and said wicket conveyor indexing means in response to the prolonged presence of a stack of bags at the unloading station, said wicket conveyor pins are all equally spaced, said wicket conveyor disabling means comprises stack sensor and linear actuator control means spaced a predetermined distance downstream of said stripping station, said spacing of the stack sensor means, the spacing between adjacent pins, and the number of chain link pitches all being expressable in units which are divisible by the integers two and three.

9. The apparatus of claim 8, wherein means are provided for adjusting the stroke of said linear actuator, the maximum stroke being expressible in the same units.

10. The apparatus of claim 6, wherein said plungers are pneumatically operated, and valve control means are provided for applying an under pressure for raising said plungers while the latter are still descending on the bag stripping strokes.

11. Apparatus for stacking thin articles such as bags or the like on pins comprising a continuously moving feed conveyor having laterally spaced means for frictionally gripping opposite edges of the articles, means mounting a plurality of longitudinally spaced, upwardly projecting pins laterally inside of and adjacent to one of said gripping means, pneumatic article stripping and impaling plungers located laterally inwardly of said gripping means, one of said plungers disposed above said pins and being apertured to clear the pins and the other of said plungers being operative to strip the article from the gripping means adjacent thereto, solenoid operated valve means for lowering and raising said plungers, means for energizing said valve plunger solenoids to lower said plungers when a moving article is positioned over said pins by said continuously moving feed conveyor, and means for energizing said solenoids to direct air to the plungers for raising the same before the plungers complete their bag stripping strokes.

12. Apparatus for stacking thin articles such as bags or the like on pins comprising a continuously moving feed conveyor having opposed endless belts for frictionally gripping opposite edges of the articles along one reach of the belts, resilient pads backing up the belts along said reach, means mounting a plurality of longitudinally spaced, upwardly projecting pins laterally inside of and adjacent to one of said gripping means, an article stripping and impaling plunger normally disposed above said pins, said plunger being apertured to clear the pins, an article stripping plunger inside of and adjacent to the other of said gripping means, actuator means for lowering and raising said plungers, and means for energizing said plunger actuator means to lower said plungers when a moving article is positioned over said pins by said continuously moving feed conveyor.

13. The apparatus of claim 12, wherein a bag stack drape bar extends along the base of and inwardly spaced from said pins, and a bag damper pad is mounted below said stripping plunger for momentarily trapping the freed end of the bag.

14. Bag making and stacking apparatus comprising a V-board for receiving and folding a web; a bag making machine having means for receiving the folded web, means for cutting and sealing the web across the machine to form bags; and a bag stacker for receiving bags from the bag making machine comprising a continuously moving bag pickup and feeder conveyor, a wicket conveyor along the side of the stacker corresponding to the side of the bag making machine that has received the edges of the web, and means for stripping the moving bags from said moving conveyor onto the wicket conveyor; and means for adjustably mounting said V-board for motion at 45° to the folded web-edge side of the bag making machine for controlling the overlap at folding while maintaining one edge of the web in a fixed lateral position.

15. Bag making and stacking apparatus comprising a V-board for receiving and folding a web, a bag making machine having means for receiving the folded web, means for punching one edge of the web, means for cutting and sealing the web across the machine to form punched bags, and a bag stacker for receiving bags from the bag making machine comprising a continuously moving bag pickup and feeder conveyor, a wicket conveyor along the side of the stacker corresponding to the side of the bag making machine that has the punches, and means for stripping the bags from said moving conveyor onto the wicket conveyor; and means adjustably mounting said V-board for motion at 45° to the punch side of the bag making machine for controlling the overlap at folding while maintaining one edge of the side of the web fold in a fixed lateral position.

16. Apparatus for making and stacking bags, comprising a V-board for receiving and folding a web; a bag making machine having means for receiving the folded web and means for cutting and sealing the web across the machine to form bags; means adjustably mounting said V-board for motion at 45° to the double web-edge side of the bag making machine; a bag stacker comprising a continuously moving feed conveyor comprising laterally spaced, longitudinally moving pairs of endless belt gripper conveyor for frictionally gripping opposed side edges of the articles, a pair of longitudinally spaced upwardly projecting pins laterally inside of and adjacent to one of said pair of gripper conveyors, a vertically movable impaling plunger normally disposed above said pins and above an article in said feed conveyor, said impaling plunger being apertured to clear the pins, a vertically moving article stripping plunger similarly located at the other pair of gripper conveyors, actuator means for simultaneously lowering and raising said plungers, and means for energizing said plunger actuator means to lower said plungers when a moving article is substantially centered over said pair of pins by said continuously moving feed conveyor, each gripper conveyor comprising forward belt idler pulleys and rearward belt drive pulleys, and means for momentarily raising and then lowering the upper idler pulley of each pair of conveyors for first receiving and then gripping the articles.

17. The apparatus of claim 16, wherein said plungers are pneumatically operated, and valve control means for applying an under pressure in a direction to raise the plungers before the latter have completed their descending, bag stripping stroke.

18. The apparatus of claim 17, wherein said pins are mounted in pairs on a wicket conveyor, and means for indexing said wicket conveyor are provided in the form of a linear actuator including a pawl for ratchet operation of the wicket conveyor, said pawl indexing the wicket conveyor on the retract stroke of said linear actuator.

19. Apparatus for producing a stack of flexible articles such as bags or the like comprising article supply means for providing a series of articles, a continuously moving feed conveyor having laterally spaced, longitudinally moving pairs of endless belt gripper conveyors for receiving and frictionally gripping opposed side edges of the articles, an endless wicket conveyor running beneath said feed conveyor, a plurality of pairs of longitudinally spaced pins projecting upwardly from said wicket conveyor, laterally inside of and adjacent to one of said grippers, an article stripping station, a vertically movable bag stripping and impaling plunger at said station and normally disposed above said pins, said plunger being apertured to clear the pins, a vertically moving article stripping plunger similarly located at the other gripper, actuator means for lowering and raising said plungers, means for energizing said plunger actuator, means to lower said plungers when a moving article is substantially centered over said pair of pins by said continuously moving conveyor, and means for indexing said wicket conveyor when it has received a completed stack of articles at said plungers to advance the stack to an unloading station, each gripper conveyor comprising forward belt idler pulleys and rearward belt drive pulleys, and means for momentarily raising and then lowering the upper idler pulley of each pair of conveyors for first receiving and then gripping the articles.

20. The apparatus of claim 19, wherein said upper and lower belt idler pulleys are longitudinally offset for accommodating slight over travel of the upper idler pulleys during lowering of the latter pulleys.

21. Apparatus for making and stacking bags comprising a bag making machine having bag forming means and a completed-bag feeder, means for driving said bag feeder through successive feeding cycles, and means providing said drive means with a series of uniformly spaced start and stop signals; a bag stacker having stacking and unloading stations, said stacker including an indexing wicket conveyor having bag impaling pins, conveyor means for receiving bags from said bag making machine feeder and conveying them over the pins at said bag stacking station, a plunger assembly at said stacking station for stripping bags from said conveyor means and impaling them on the associated pins, means for reciprocating said plunger assembly in synchronism with said bag making machine feeder, and means for indexing said wicket conveyor after a stack of bags is completed at said stacking station; control means for stopping said bag making machine feeder and said plunger assembly and initiating indexing of said wicket conveyor at the end of one bag feeding cycle, and means for re-starting said feeder and plunger assembly upon occurrence of a start signal which follows completion of the indexing of said wicket conveyor.

22. The apparatus of claim 12, wherein said feed conveyor belts are longitudinally corrugated, with said corrugations interfitting so that the belts grip the bags firmly over a small area, but with said resilient pads yielding under plunger force on the bags to accommodate stripping of the bags from between the belts of said plungers, without tearing the bags.

23. Bag stacking and unloading apparatus comprising a wicket conveyor having a plurality of pairs of projecting pins, a stacking station wherein said pins project upwardly for receiving bags, reciprocating plunger means at said stacking station for impaling bags on the pair of pins at said station, an unloading station wherein a pair of pins projects in an unobstructed zone so that a stack of bags can be removed therefrom, and means for indexing said wicket conveyor to bring a stack of bags to said unloading station, said pins being hollow for receiving a transfer wicket.

24. Apparatus for stacking thin articles such as bags or the like on pins comprising a moving feed conveyor having means for frictionally gripping opposite edges of the articles, means mounting a plurality of longitudinally spaced, upwardly projecting pins laterally inside of and adjacent to one side of said gripping means, an article stripping and impaling plunger normally disposed above said pins for stripping articles from said movable feed conveyor and impaling them along one end on said pins, means for lowering and raising of said plunger and means wherein said last mentinoed means is effective to locate an article on said pins when said plunger is lowered.

25. Bag making and stacking apparatus comprising a V-board for receiving and folding a web; a bag making machine having means for receiving the folded web and means for cutting and sealing the web across the machine to form bags; and a bag stacker for receiving bags from the bag making machine comprising a continuously moving bag pick-up and feeder conveyor, a wicket conveyor along the side of the stacker corresponding to the side of the bag making machine that has received the edges of the web, and means for stripping the moving bags from said moving conveyor onto the wicket conveyor; and means for adjustably mounting said V-board for motion at 45 degrees to the double web-edge side of the bag making machine for controlling the overlap at folding while maintaining one edge of the web fold in a fixed lateral position.

26. Bag making and stacking apparatus comprising a V-board for receiving and folding a web; a bag making machine having means for receiving the folded web, means for punching one edge of the web and means for cutting and sealing the web across the machine to form punch bags; and a bag stacker for receiving bags from the bag making machine comprising a continuously moving bag pick-up and feeder conveyor, a wicket conveyor along the side of the stacker corresponding to the side of the bag making machine that has the punches, and means for stripping the bag from said moving conveyor onto the wicket conveyor; and means adjustably mounting said V-board for motion at 45 degrees to the punch side of the bag making machine for controlling the overlap at folding while maintaining one edge of the web fold in a fixed lateral position.

27. Apparatus for making and stacking bags comprising a bag making machine feeder, means for driving said bag feeder through successive feeding cycles, and means providing said drive means with a series of uniformly spaced start and stop signals; a bag stacker having stacking wicket conveyor having bag impaling pins, means for indexing said wicket conveyor after a stack of bags is completed at said stacking station; control means for stopping said bag making machine feeder and initiating indexing of said wicket conveyor at the end of one bag feeding cycle, and means for restarting said feeder upon occurrence of a start signal which follows completion of the indexing of said wicket conveyor.

28. A bag stacking mechanism arranged for cooperation with a bag making machine of the type which produces bags by severing and welding folded sheet material at longitudinally spaced intervals, said stacking mechanism comprising gripper conveyor means for firmly engaging opposed lateral margins of the bag and for transporting the bag longitudinally of the bag making machine, means mounting a plurality of longitudinally spaced upwardly projecting pins located laterally inwardly adjacent one margin of the material, and means operable in synchronism with the bag making machine for stripping the bag from said gripper conveyor means and impaling a completed bag on said pins.

29. The apparatus of claim 28 wherein said pin mounting means comprises an endless wicket conveyor and wherein said pins are in pairs, means for indexing said wicket conveyor, means for counting the cycles of said plunging and stripping means, and control means for actuating said wicket conveyor indexing means when said cycle counting means has counted a predetermined number of bags.

30. The apparatus according to claim 28 wherein said synchronously operable means comprises a reciprocating plunger assembly, means for reciprocating said plunger assembly, and means for indexing said pin mounting means after a stack of bags is completed, control means for stopping said bag making machine and initiating indexing of said pin mounting means at the end of one feeding cycle, and means for restarting said feeder upon occurrence of a start signal which follows completion of the indexing of said pin mounting means.

31. Bag stacking and unloading apparatus comprising a wicket conveyor having a plurality of pairs of projecting pins, a stacking station wherein successive pairs of said pins are located for receiving bags, reciprocating plunger means at said stacking station for impaling bags on the pair of pins at said station, an unloading station spaced from said stacking station so that a pair of pins are located to facilitate removal of a stack of bags, and means for indexing said wicket conveyor to bring a stack of bags to said unloading station, said pins being hollow for receiving a transfer wicket.

32. Apparatus for stacking thin articles such as bags or the like on pins comprising a moving feed conveyor having means for frictionally gripping the articles, means mounting a plurality of longitudinally spaced upwardly projecting pins laterally inside of and adjacent to one side of said gripping means, an article stripping and impaling plunger normally disposed above said pins for stripping articles from said feed conveyor and impaling them along one end on said pins, and means for lowering and raising said plunger, said plunger being effective when lowered to impale an article on said pins.

33. Apparatus for stacking articles such as flattened bags or the like, comprising a moving feed conveyor comprising laterally spaced, longitudinally moving endless belt gripper conveyors having opposed reaches for frictionally gripping the articles, vertically moving, article stripping plunger means disposed between said gripper conveyors, actuator means for lowering and raising said plunger means, and a bag receiving conveyor mounting a plurality of longitudinally spaced upwardly projecting pins laterally inside of and adjacent said feed conveyor, said actuator being effective when lowered to impale the bags on a longitudinally adjacent pair of such pins.

34. Apparatus for stacking thin articles such as bags or the like on pins comprising means mounting a plurality of said pins to project upwardly and in longitudinally spaced relation, said mounting means comprises an endless wicket conveyor having said pins arranged in pairs, means for indexing said wicket conveyor, means for transporting said articles over said pins, a plunger for impaling said articles on said pins, plunger actuating means, means for counting the plunger cycles, and control means for actuating said wicket conveyor indexing means and interrupting operation of said plunger actuating means when said cycle counting means has counted a predetermined number of articles.

References Cited

UNITED STATES PATENTS

| | | | |
|---|---|---|---|
| 3,102,632 | 9/1963 | Moser | 93—93 |
| 2,266,171 | 12/1941 | Davis | 270—58 |
| 2,597,415 | 5/1952 | Watson | 198—20 |
| 2,873,115 | 2/1959 | Dusenbury | 270—58 |
| 3,147,971 | 9/1964 | Key | 271—68 |
| 3,183,750 | 5/1965 | Davis | 83—660 X |
| 3,240,091 | 3/1966 | Gilbert | 83—30 X |
| 3,351,215 | 11/1967 | Kitch | 93—93 |
| 2,529,750 | 11/1950 | Weingart | 83—91 |
| 2,821,391 | 1/1958 | Buccicone | 93—93 X |
| 2,971,874 | 2/1961 | Canno | 93—18 X |
| 3,017,178 | 1/1962 | Brickle | 271—63 |
| 3,059,549 | 10/1962 | Seiden | 93—20 |
| 3,064,827 | 11/1962 | Bostock | 214—6 |
| 3,105,422 | 10/1963 | Simpson | 93—93 |
| 3,159,122 | 12/1964 | Hedegaard | 83—83 X |
| 3,192,096 | 6/1965 | Rhine | 198—178 X |

WAYNE A. MORSE, Jr., *Primary Examiner.*

U.S. Cl. X.R.

53—78; 83—95; 93—20, 93; 198—178; 270—58; 271—63